United States Patent
Wei

(10) Patent No.: US 12,530,061 B2
(45) Date of Patent: *Jan. 20, 2026

(54) DISPLAY PANEL AND DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventor: Qibing Wei, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/749,628

(22) Filed: Jun. 21, 2024

(65) Prior Publication Data
US 2024/0338059 A1 Oct. 10, 2024

Related U.S. Application Data

(63) Continuation of application No. 18/148,524, filed on Dec. 30, 2022, now Pat. No. 12,045,098.

(30) Foreign Application Priority Data

Sep. 6, 2022 (CN) .......................... 202211086331.2

(51) Int. Cl.
*G06F 1/16* (2006.01)
(52) U.S. Cl.
CPC .................. *G06F 1/1686* (2013.01)
(58) Field of Classification Search
CPC .................................................. G06F 1/1686
See application file for complete search history.

(56) References Cited

U.S. PATENT DOCUMENTS 7,110,064 B2* 9/2006 Kameda ................. B60K 35/60
362/23.17
7,585,121 B2* 9/2009 Tsai ....................... H04N 23/58
396/351

(Continued)

FOREIGN PATENT DOCUMENTS

CN 115002253 A 9/2022
WO WO-2011141930 A1 * 11/2011 ........... H04N 23/695

OTHER PUBLICATIONS

Black, Mary; Sony Xperia XZ2 Confirmed: Release Date, Price & Specifications; Feb. 28 2018; https://www.techadvisor.co.uk/new-product/mobile-phone/sony-xperia-xz2-3672617/.*

(Continued)

*Primary Examiner* — Adrian S Wilson
(74) *Attorney, Agent, or Firm* — Wiersch Law Group

(57) ABSTRACT

A display panel and a display device are described. In an embodiment, the display panel includes a first through-hole, a second through-hole, and a third through-hole that are provided in a display region. In an embodiment, a first non-display region surrounds the first through-hole and the second through-hole, and a second non-display region surrounds the third through-hole. In an embodiment, a minimum distance between the first through-hole and the second through-hole in a first direction is smaller than a minimum distance between the second through-hole and the third through-hole in the first direction. In an embodiment, the display region has a symmetry axis extending along a second direction. In an embodiment, the symmetry axis overlaps with the second through-hole, or is located between the second through-hole and the third through-hole. Thus, the overall symmetry of the display region is improved.

28 Claims, 16 Drawing Sheets

(56) References Cited

U.S. PATENT DOCUMENTS

| | | | | |
|---|---|---|---|---|
| 8,632,182 B2* | 1/2014 | Chen | ................... | H04N 13/366 |
| | | | | 351/219 |
| 8,890,181 B2* | 11/2014 | Wang | ................. | G07F 17/3211 |
| | | | | 257/88 |
| 9,940,888 B2* | 4/2018 | Ryoo | ................... | G09G 3/3648 |
| 10,304,913 B2* | 5/2019 | Choi | ................... | H10K 59/8731 |
| 10,847,599 B2* | 11/2020 | Jeon | ................... | H10K 59/1216 |
| 10,910,461 B2* | 2/2021 | Lee | ...................... | H10K 59/00 |
| 11,011,595 B2* | 5/2021 | Lee | ................... | H10K 59/8722 |
| 11,100,858 B2* | 8/2021 | An | ....................... | G09G 3/3233 |
| 11,101,340 B2* | 8/2021 | Sung | ................... | G09G 3/3233 |
| 11,158,238 B2* | 10/2021 | Yamashita | ........... | G09G 3/2092 |
| 11,251,235 B2* | 2/2022 | Yoon | ................... | H10K 59/1216 |
| 11,270,643 B2* | 3/2022 | Lee | ...................... | G09G 3/3233 |
| 11,282,900 B2* | 3/2022 | An | ...................... | H10K 59/122 |
| 11,342,403 B2* | 5/2022 | Um | ...................... | H10K 59/131 |
| 11,398,541 B2* | 7/2022 | Ito | ...................... | H10K 59/8731 |
| 11,507,151 B2* | 11/2022 | Choi | ................... | G06F 1/189 |
| 11,605,698 B2* | 3/2023 | Choi | ................... | H10K 59/131 |
| 11,653,535 B2* | 5/2023 | Jeon | ................... | H10K 59/131 |
| | | | | 257/71 |
| 11,659,743 B2* | 5/2023 | Lee | ................... | H10K 59/131 |
| | | | | 257/40 |
| 11,665,937 B2* | 5/2023 | Jeon | ................... | H10K 59/8722 |
| | | | | 257/88 |
| 11,706,957 B2* | 7/2023 | Kim | ................... | H10K 59/121 |
| | | | | 257/40 |
| 11,825,707 B2* | 11/2023 | Lee | ...................... | H10K 50/844 |
| 11,832,502 B2* | 11/2023 | An | ...................... | H10K 59/131 |
| 11,915,626 B2* | 2/2024 | Kim | ................... | H04M 1/0266 |
| 12,004,390 B2* | 6/2024 | Lee | ...................... | H10K 59/131 |
| 12,045,098 B2* | 7/2024 | Wei | ...................... | G06F 1/1686 |
| 12,048,213 B2* | 7/2024 | Choi | ................... | H10K 59/131 |
| 12,108,646 B2* | 10/2024 | Bok | ...................... | H10K 59/121 |
| 12,114,545 B2* | 10/2024 | Yang | ................... | H10K 59/1216 |
| 12,133,412 B2* | 10/2024 | Won | ................... | H10K 50/8426 |
| 12,137,585 B2* | 11/2024 | Zhang | ................... | G09F 9/33 |
| 12,193,282 B2* | 1/2025 | Zhang | ................... | G09G 3/3233 |
| 12,193,312 B2* | 1/2025 | An | ...................... | G09G 3/3233 |
| 2014/0078594 A1* | 3/2014 | Springer | ................. | G02B 7/16 |
| | | | | 359/821 |
| 2014/0197428 A1* | 7/2014 | Wang | ................. | G07F 17/3211 |
| | | | | 257/88 |
| 2020/0168691 A1* | 5/2020 | Choi | ................... | H10K 59/131 |
| 2020/0176539 A1* | 6/2020 | Sung | ................... | H10K 59/805 |
| 2022/0206545 A1* | 6/2022 | Cha | ................... | G06F 1/1686 |
| 2023/0129729 A1* | 4/2023 | Huang | ................ | H10K 59/121 |
| | | | | 257/40 |
| 2023/0377508 A1* | 11/2023 | Zhou | ................... | H10D 86/60 |
| 2023/0393685 A1* | 12/2023 | Wei | ...................... | G06F 3/0446 |
| 2024/0081110 A1* | 3/2024 | Wei | ...................... | G09G 3/3233 |

OTHER PUBLICATIONS

Chinese Office Action(202211086331.2); Date of Mailing: Dec. 9, 2024(12 pages).

* cited by examiner

DISPLAY PANEL AND DISPLAY DEVICE

CROSS-REFERENCE TO RELATED APPLICATIONS

The present application claims to the benefit of Chinese Patent Application No. 202211086331.2, filed on, Sep. 6, 2022, the content of which is incorporated herein by reference in its entirety.

TECHNICAL FIELD

The present disclosure relates to the field of display technologies, and in particular, to a display panel and a display device.

BACKGROUND

Conventionally, in order to pursue a narrow frame to improve a user's visual experience, technical solutions such as a water-drop screen, a notch screen, and a hole-digging screen have emerged. The hole-digging screen is manufactured by forming a hole in the display region, and then an optical device is arranged in the hole when assembling a display module. The forming of the hole results in poor symmetry of the display region, which affects the display effect.

SUMMARY

The embodiments of the present disclosure provide a display panel and a display device, aiming to improve the overall symmetry of the display region.

In a first aspect, the present disclosure provides a display panel. In an embodiment, the display panel has a display region and a non-display region, and comprises: a first through-hole, a second through-hole, and a third through-hole that are arranged along a first direction in the display region. In an embodiment, the non-display region comprises a first non-display region and a second non-display region. In an embodiment, the first non-display region surrounds the first through-hole and the second through-hole, and the second non-display region surrounds the third through-hole. In an embodiment, the first non-display region and the second non-display region are spaced from each other. In an embodiment, a minimum distance $d_1$ between the first through-hole and the second through-hole in a first direction and a minimum distance $d_2$ between the second through-hole and the third through-hole in the first direction satisfy: $d_1<d_2$. The display region has a symmetry axis extending along a second direction, the second direction intersecting the first direction. In an embodiment, the symmetry axis overlaps with the second through-hole or is located between the second through-hole and the third through-hole.

In a second aspect, the present disclosure provides a display device including a display panel. In an embodiment, the display panel has a display region and a non-display region, and comprises: a first through-hole, a second through-hole, and a third through-hole that are arranged along a first direction in the display region. In an embodiment, the non-display region comprises a first non-display region and a second non-display region. In an embodiment, the first non-display region surrounds the first through-hole and the second through-hole, and the second non-display region surrounds the third through-hole. In an embodiment, the first non-display region and the second non-display region are spaced from each other. In an embodiment, a minimum distance $d_1$ between the first through-hole and the second through-hole in a first direction and a minimum distance $d_2$ between the second through-hole and the third through-hole in the first direction satisfy: $d_1<d_2$. In an embodiment, the display region has a symmetry axis extending along a second direction, the second direction intersecting the first direction. The symmetry axis overlaps with the second through-hole or is located between the second through-hole and the third through-hole.

BRIEF DESCRIPTION OF THE DRAWINGS

To describe the technical solutions in the embodiments of the present disclosure or in the related art more clearly, the following briefly describes the accompanying drawings required for describing the embodiments or the related art. The accompanying drawings in the following description show some embodiments of the present disclosure, and a person skilled in the art can still derive other drawings from these accompanying drawings.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

Some embodiments of the present disclosure provide a display panel. Three through-holes are formed in a display region of the display panel. The display panel includes multiple layers that are stacked. The through-hole penetrates through at least one of the layers of the display panel. No pixels are provided in the region where the through-holes are arranged, and thus this region cannot display an image normally. Some functional devices, such as photosensitive devices (such as cameras), can be arranged in the region where the through-holes are arranged, so that there is no need to arrange these devices at a frame of the display panel, which can reduce the width of the frame of the display panel. In the embodiments of the present disclosure, the relative positions of the three through-holes are designed to improve the overall symmetry of the region capable of displaying images with the through-holes, to improve the display effect.

Figure 1:
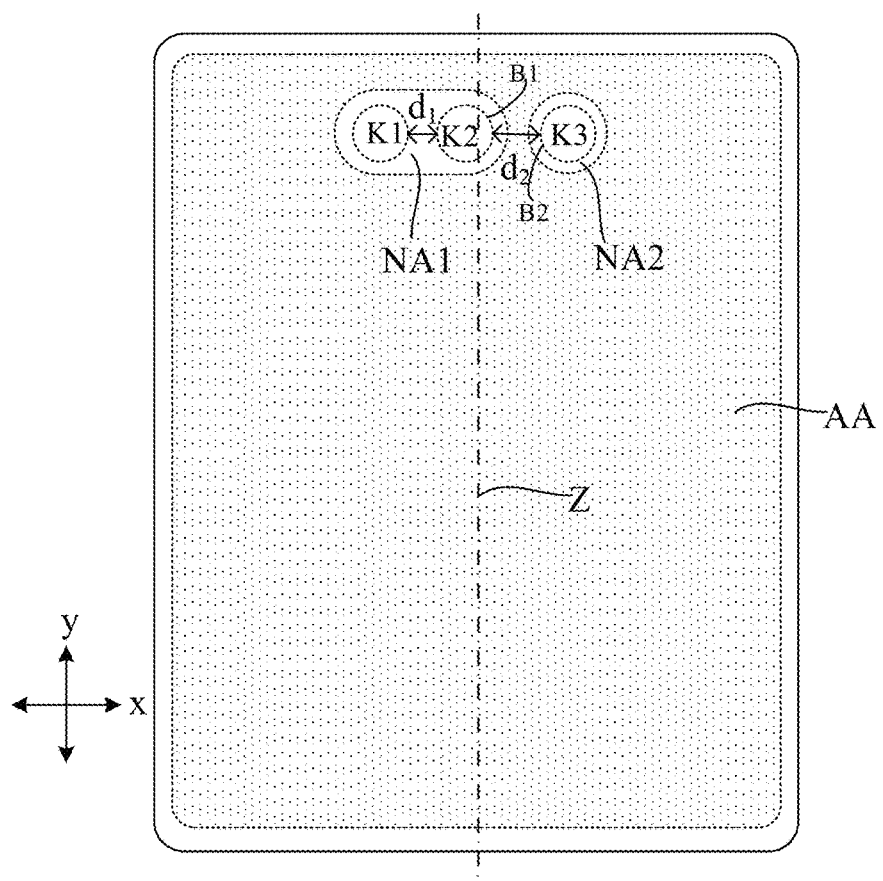
FIG. 1 is a partial schematic diagram of a display panel according to some embodiments of the present disclosure.

FIG. 1 is a partial schematic diagram of a display panel provided by some embodiments of the present disclosure. In some embodiments of the present disclosure, as shown in FIG. 1, the display panel has a display region AA and a non-display region. The display panel includes a first through-hole K1, a second through-hole K2, and a third through-hole K3 that are arranged in the display region AA in a first direction x. The non-display region includes a first non-display region NA1 and a second non-display region NA2, the first non-display region NA1 surrounds the first through-hole K1 and the second through-hole K2, and the second non-display region NA2 surrounds the third through-hole K3. The first non-display region NA1 and the second non-display region NA2 are not connected to each other, which indicates that there is a region capable of displaying images between the second through-hole K2 and the third through-hole K3. A minimum distance $d_1$ between the first through-hole K1 and the second through-hole K2 in the first direction x, and a minimum distance $d_2$ between the second through-hole K2 and the third through-hole K3 satisfy: $d_1<d_2$. A shape of each through-hole in FIG. 1 is illustrated as a circle. In other embodiments, the shape of each through-hole can be other shape, such as a rectangle, or an ellipse. Since the first non-display region NA1 surrounds two through-holes, a length of a region where the first non-display region NA1, the first through-hole K1 and the second through-hole K2 are located in the first direction is different from a length of the region where the first non-display region NA1, the first through-hole K1 and the second through-hole K2 are located in the second direction. The second direction y intersects with the first direction x. As shown in FIG. 1, the display region AA has a symmetry axis Z extending along the second direction y, and the symmetry axis Z overlaps with the second through-hole K2. In other embodiments, the symmetry axis Z is located between the second through-hole K2 and the third through-hole K3. In some embodiments, the symmetry axis Z is located in a region of the display region that is located between the second through-hole K2 and the third through-hole K3. That is, the symmetry axis Z is located near the second through-hole K2.

In the display panel provided by the embodiments of the present disclosure, the display panel includes three through-holes arranged along the first direction x in the display region AA, and the symmetry axis Z of the display region AA in the second direction y is located near the second through-hole K2, a region between the first through-hole K1 and the second through-hole K2 is configured as a non-display region, and $d_1<d_2$, which can make the arrangement of the first through-hole K1 and the second through-hole K2 relatively compact, thereby reducing an area of the non-display region where the first through-holes K1 and the second through-holes K2 are located, and improving an overall symmetry of the region capable of displaying images with the through-holes.

In the embodiments of the present disclosure, a non-display region having a certain area is located between the first through-hole K1 and the second through-hole K2, so that some circuit wires can be arranged therein. The first non-display region NA1 and the second non-display region NA2 are not connected to each other, so that a display region having a certain area is located between the second through-hole K2 and the third through-hole K3. The $d_1$ is the minimum distance of the non-display region located between the first through-hole K1 and the second through-hole K2 in the first direction x, and the $d_2$ includes a width of the first non-display region NA1 located at a side of the second through-hole K2 in the first direction x, a width of the second non-display region NA2 located at a side of the third through-hole K3 in the first direction, and a width of the display region located between the second through-hole K2 and the third through-hole K3 in the first direction.

As shown in FIG. 1, the second through-hole K2 has a first edge B1 close to the third through-hole K3, and the third through-hole K3 has a second edge B2 close to the second through-hole K2. In the first direction x, a minimum distance from the first edge B1 to the symmetry axis Z is smaller than a minimum distance from the second edge B2 to the symmetry axis Z. With such a configuration, the symmetry axis Z can be arranged near the second through-hole K2, which improves an overall symmetry of the region capable of displaying images with the through-holes.

Figure 2:
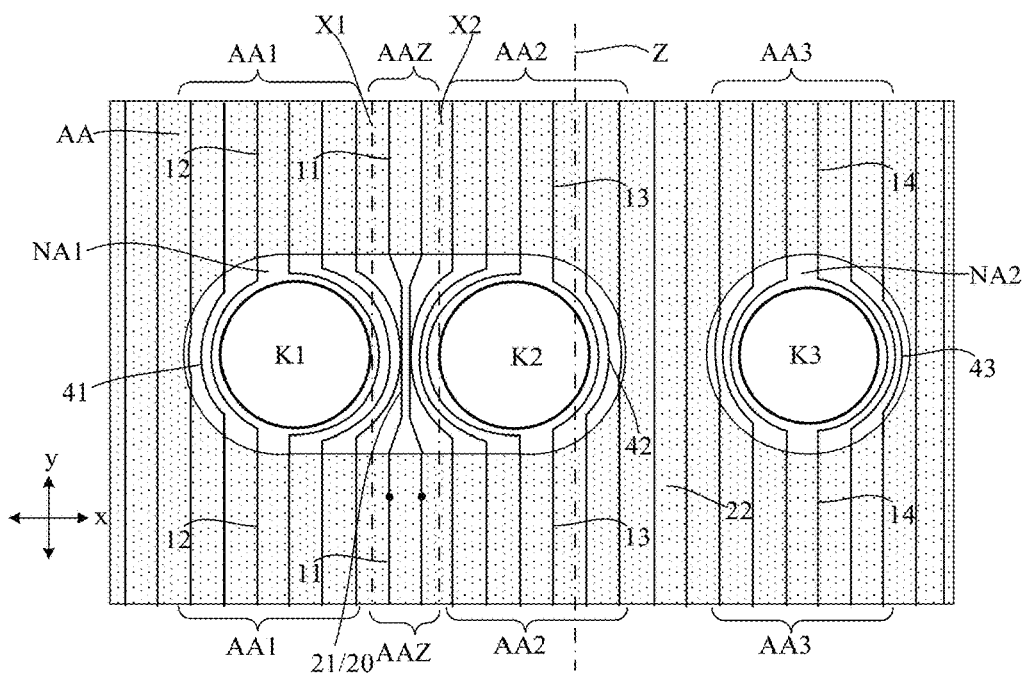
FIG. 2 is another schematic diagram of a display panel according to some embodiments of the present disclosure.

FIG. 2 is a schematic diagram of a display panel provided by some embodiments of the present disclosure. In some embodiments, as shown in FIG. 2, the display region AA has a first virtual straight line X1 and a second virtual straight line X2 each extending along the second direction y, an edge of the first through-hole K1 that is closest to the second through-hole K2 in the first direction x intersects with the first virtual straight line X1, and an edge of the second through-hole K2 that is closest to the first through-hole K1 in the first direction x intersects with the second virtual straight line X2. The display region AA includes a middle region AAZ, which is a region of the display panel located between the first virtual straight line X1 and the second virtual straight line X2.

The display region AA includes a first display region AA1, a second display region AA2, and a third display region AA3. In the second direction y, two first display regions AA1 are respectively located at two sides of the first through-hole K1, two second display regions AA2 are respectively located at two sides of the second through-hole K2, and two third display regions AA3 are respectively located at two sides of the third through-hole K3. The first virtual straight line X1 is a virtual boundary between the first display region AA1 and the middle region AAZ, and the second virtual straight line X2 is a virtual boundary between the second display region AA2 and the middle region AAZ.

The display panel includes a first signal line 12, a second signal line 13, and a third signal line 14 that each extend along the second direction y. At least one of the first signal lines 12 is located in the first display region AA1, and at least one of the second signal lines 13 is located in the second display region AA2, and the third signal line 14 is located in the third display region AA3.

The display panel includes a first wound line 41, a second wound line 42, and a third wound line 43. The first signal lines 12 respectively located at two sides of the first through-hole K1 are connected to each other by the first wound line 41, the second signal lines 13 respectively located at two sides of the second through-hole K2 are connected to each other by the second wound line 42, and the third signal lines 14 respectively located at two sides of the third through-hole K3 are connected to each other by the third wound line 43.

As shown in FIG. 2, the first wound line 41 and the second wound line 42 are located in the first non-display region NA1, and the third wound line 43 is located in the second non-display region NA2. In the first non-display region NA1, the first wound line 41 extends along the edge of the first through-hole K1, and the second wound line 42 extends along the edge of the second through-hole K2. In the second non-display region NA2T, the third wound line 43 extends along the edge of the third through-hole K3.

In certain embodiments, in the second direction y, the first display region AA1 corresponds to the first through-hole K1, the second display region AA2 corresponds to the second through-hole K2, and the third display region AA3 corresponds to the third through-hole K3. Then, in the second direction y, the first signal line 12 corresponds to the first through-hole K1, the second signal line 13 corresponds to the second through-hole K2, and the third signal line 14 corresponds to the third through-hole K3. The first wound line 41, the second wound line 42, and the third wound line 43 are respectively wound in the non-display region near the through-holes, in such a manner that the signal lines in the first display region AA1, the second display region AA2, and the third display region AA3, which are disconnected by the through-holes, are connected in a same way. In this way, the brightness difference between the first display region AA1, the second display region AA2, and the third display region AA3 can be reduced. Thus, a display split screen phenomenon at two sides of the symmetry axis Z can be avoided.

Figure 3:
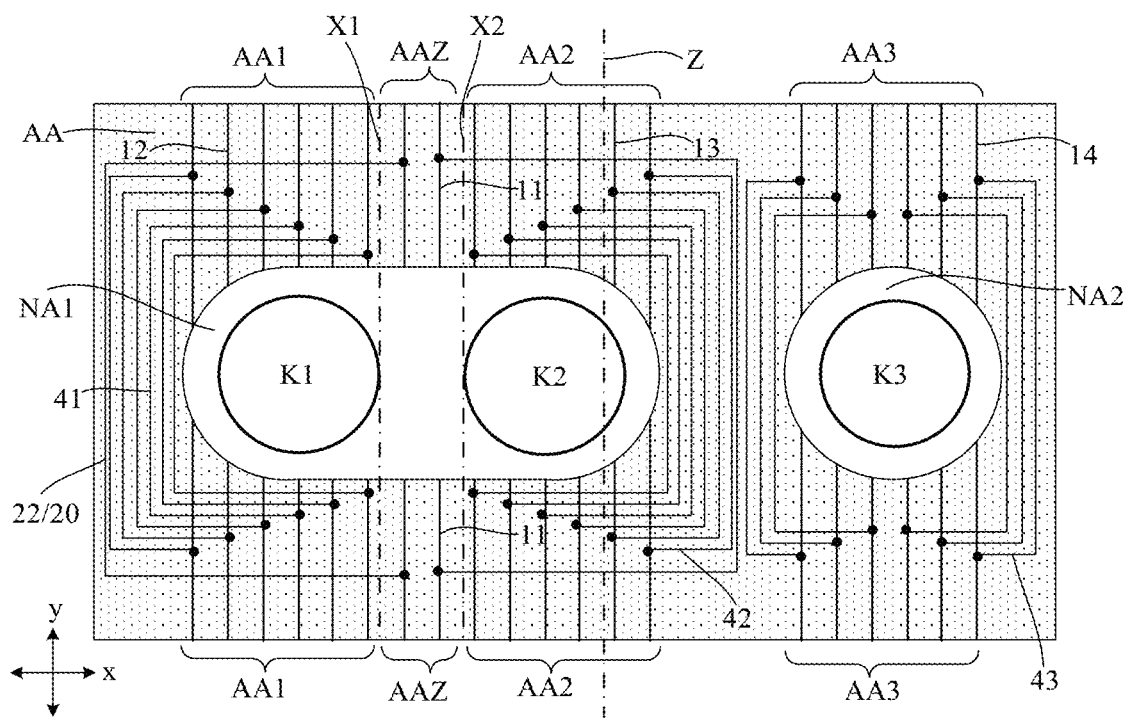
FIG. 3 is another schematic diagram of a display panel according to some embodiments of the present disclosure.

FIG. 3 is another schematic diagram of a display panel according to some embodiments of the present disclosure. In some other embodiments, as shown in FIG. 3, the first wound line 41, the second wound line 42, and the third wound line 43 are all located in the display region AA. The first wound line 41 is wound at a side of the first through-hole K1 away from the second through-hole K2, and the second wound line 42 is wounded in a region of the display region AA that is between the second through-hole K2 and the third through-hole K3. At least one of the third wound lines 43 is wound in a region of the display region AA that is located between the second through-hole K2 and the third through-hole K3, and at least another third wound line 43 of the third wound lines 43 is located in another region of the display region AA that is located at a side of the third through-hole K3 away from the second through-hole K2. In an embodiment, the wound lines each connecting two signal lines that are respectively located at two sides of each of the through-holes are all arranged in the display region AA, so that the width of the frame of the non-display region around each through-hole can be reduced. The signal lines in the first display region AA1, the second display region AA2, and the third display region AA3, which are disconnected by the through-holes, are connected in a same way. In this way, the brightness difference between the first display region AA1, the second display region AA2, and the third display region AA3 can be reduced, and the display split screen phenomenon at two sides of the symmetry axis Z can be avoided.

In an embodiment of the present disclosure, the signal lines in the first display region AA1, the second display region AA2, and the third display region AA3, which are disconnected by the through-holes, are connected in a same way. In this way, the brightness difference between the first display region AA1, the second display region AA2, and the third display region AA3 can be reduced. Since the middle region AAZ exists between the first display region AA1 and the second display region AA2, a middle stripe will be generated in the display region AA (generated by the middle region AAZ) due to a display difference between the middle region AAZ and each of the first display region AA1 and the second display region AA2, thereby causing the split screen display. Therefore, how to connect the signal lines that are disconnected in the middle region AAZ is also a technical problem to be solved.

In some embodiments, as shown in FIG. 2, the display panel includes a fourth signal line 11 extending along the second direction y, and the fourth signal line 11 is located in the middle region AAZ. The display panel includes a connection line 20 including a first connection line 21, and each of two ends of the first connection line 21 is connected to one of the fourth signal lines 11 located in the middle region AAZ located at two sides of the first non-display region NA1. The first connection line 21 is located between the first through-hole K1 and the second through-hole K2. In certain embodiments, the connection mode of the signal line in the middle region AAZ that are disconnected by the through-hole is designed, and the first connection line 21 is used to connect the fourth signal lines in the middle regions AAZ that are located at two sides of the first non-display region NA1. The connection mode of the fourth signal lines 11 in the middle regions AAZ that are respectively located at two sides of the first non-display region NA1 will not affect the connection mode of the signal lines in the display region AA corresponding to each through-hole, so that the signal lines in the first display region AA1, the second display region AA2, and the third display region AA3, which are disconnected by the through-holes, are connected in a same way, thereby reducing the brightness difference between the first display region AA1, the second display region AA2, and the third display region AA3, and thus avoiding the display split screen phenomenon at two sides of the symmetry axis Z. In some embodiments, the connection mode of the fourth signal lines 11 located in the two middle regions AAZ are the same as the connection mode of the first signal line and the second signal line, thereby reducing the brightness difference between the middle region AAZ and each of the first display region AA1 and the second display region. AA2, and thus avoiding a middle stripe.

Since the region between the first through-hole K1 and the second through-hole K2 is a part of the non-display region, the fourth signal line 11 in the middle region AAZ defined by the first virtual straight line X1 and the second virtual straight line X2 will also be disconnected by the first non-display region NA1. In the embodiments of the present disclosure, the fourth signal lines 11 are connected to each other by the first connection line 21 located between two through-holes, to ensure the electrical connection between two fourth signal lines 11 that are configured to drive the pixel circuits in a same column. The first connection line 21 is arranged in the region of the non-display region located between the first through-hole K1 and the second through-hole K2, so that the non-display region between the two through-holes can be reasonably utilized. The first through-hole K1 and the second through-hole K2 are independent from each other and are not connected to each other, so some circuit lines can be concentrated in the region between the first through-hole K1 and the second through-hole K2 without affecting the display effect.

In some embodiments, as shown in FIG. 2, at least one segments of the segments of the first connection line 21 between the first through-hole K1 and the second through-hole K2 does not extend along the edge of the first through-hole K1 or the edge of the second through-hole K2. In this way, a certain space can be reserved between the first connection line 21 and the through-hole, to facilitate the design of other wirings.

In some embodiments of the present disclosure, a structure such as a partition column or a crack detection line is further provided in the first non-display region NA1 between the first through-hole K1 and the second through-hole K2.

In an example product, there are multiple fourth signal lines 11 in the middle region AAZ, for example, there are ten or dozens of fourth signal lines 11. In an embodiment of the present disclosure, in order to clearly illustrate an implementation of the electrical connection between two fourth signal lines 11 located at two sides of the first non-display region NA1, FIG. 2 only schematically shows that two fourth signal lines 11 are provided in one of the two middle regions AAZ. In the following embodiments, the number of the fourth signal lines 11 arranged in the middle regions AAZ is only schematic, and is not intended to limit the present disclosure.

In other embodiments, as shown in FIG. 3, the connection line 20 includes a second connection line 22, and the second connection line 22 connects the fourth signal lines 11 that are located at two sides of the first non-display region NA1, and at least a part of the second connection line 22 is located in the display region AA. As shown in FIG. 3, the second connection line 22 is entirely located in the display region AA for illustration. Some embodiments in which at least one line segment of the line segments of the second connection line 22 is located in the display region AA and another line segment of the line segments of the second connection line 22 is located in the non-display region will be described in the following. In certain embodiments, the second connection line 22 is used to connect the fourth signal lines 11 that are located at two sides of the first non-display region NA1, and at least one line segment of the second connection line 22 is arranged in the display region AA. In this way, the second connection line 22 does not occupy the space of the first non-display region NA1 around the first through-hole K1 and the second through-hole K2, thereby ensuring the electrical connection between the two fourth signal lines 11 that are configured to drive the pixel circuits in a same column, and reducing a sum of the area of the first non-display region NA1, the area of the first through-hole K1, and the area of the second through-hole K2, and thus improving the display visual effect. The connection mode of the fourth signal lines 11 in the middle regions AAZ that are located at two sides of the first non-display region NA1 will not affect the connection mode of the signal line in the display region AA corresponding to each through-hole, so that the signal lines in the first display region AA1, the second display region AA2, and the third display region AA3, which are disconnected by the through-holes, are connected in a same way. Therefore, the brightness difference between the first display region AA1, the second display region AA2, and the third display region AA3 can be reduced. Thus, a display split screen phenomenon at two sides of the symmetry axis Z can be avoided. In some embodiments, the connection mode of the fourth signal lines 11 located in two middle regions AAZ are the same as the connection mode of the first signal line and the second signal line, thereby reducing the brightness difference between the middle region AAZ and each of the first display region AA1 and the second display region. AA2, and thus avoiding a middle stripe.

In the embodiments shown in FIG. 2, the fourth signal lines 11 located in the middle regions AAZ that are located at two sides of the first non-display region NA1 are connected to each other by the first connection line 21, the first wound line 41 and the second wound line 42 are located in the first non-display region NA1, and the third wound line 43 is located in the second non-display region NA2. In another embodiment, the fourth signal line 11 located in the middle regions AAZ that are located at two sides of the first non-display region NA1 are connected to each other by the first connection line 21, and the first wound line 41, the second wound line 42, and the third wound line 43 are all located in the display region AA.

In the embodiments shown in FIG. 3, the fourth signal lines 11 located in the middle regions AAZ that are located at two sides of the first non-display region NA1 are connected to each other by the second connection line 22, and the first wound line 41, the second wound line 42, and the third wound line 43 are all located in the display region AA. In another embodiment, the fourth signal lines 11 located in the middle regions AAZ that are located at two sides of the first non-display region NA1 are connected to each other by the second connection line 22, the first wound line 41 and the second wound line 42 are located in the first non-display region NA1, and the third wound line 43 is located in the second non-display region NA2.

In other embodiments, the connection lines 20 in the display panel include both the first connection line 21 and the second connection line 22, at least a pair of the fourth signal lines 11 located at two sides of the first non-display region NA1 is electrically connected to each other by the first connection line 21, and at least another pair of the fourth signal lines 11 located at two sides of the first non-display region NA1 is electrically connected to each other by the second connection line 22, which are not shown in the drawings herein.

Figure 4:
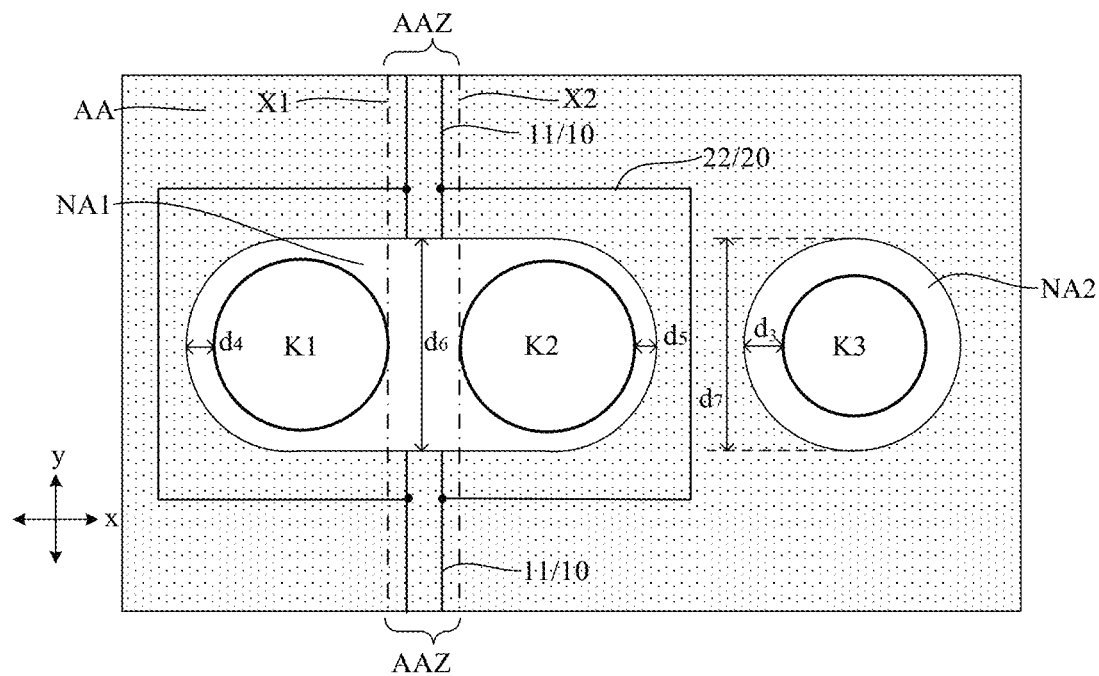
FIG. 4 is another partial schematic diagram of a display panel according to some embodiments of the present disclosure.

FIG. 4 is another partial schematic diagram of a display panel provided by some embodiments of the present disclosure. In some embodiments, as shown in FIG. 4, in the first direction x, a width $d_3$ of the second non-display region NA2 located at a side of the third through-hole K3, a width $d_4$ of the first non-display region NA1 located at a side of the first through-hole K1 away from the second through-hole K2, and a width $d_5$ of the first non-display region NA1 located at a side of the second through-hole K2 close to the third through-hole K3 satisfy: $d_3>d_4$, and $d_3>d_5$. In other words, a width of a frame around the third through-hole K3 is greater than a width of a frame around the first through-hole K1, and is also greater than a width of a frame around the second through-hole K2. Such a configuration enables relatively more circuit wires to be arranged in the second non-display region NA2 to meet design requirements.

The display panel includes not only a longitudinal signal lines 10 extending along the second direction y shown in FIG. 4, but also includes a lateral signal line (not shown in FIG. 4) extending along the first direction x. The longitudinal signal lines 10 include fourth signal lines 11 located in the middle regions AAZ. The lateral signal lines are also disconnected by the first non-display region NA1 and the second non-display region NA2. In order to ensure the electrical connection between the lateral signal lines that are disconnected, in some embodiments, wound lines are provided in the non-display region. Since the first non-display region NA1 surrounds the first through-hole K1 and the second through-hole K2, a length of a region occupied by the first non-display region NA1 and the two through-holes in the first direction x is greater than a length of a region occupied by the second non-display region NA2 and the third through-hole K3 in the first direction x. In some embodiments, the wound line used to realize the electrical connection between the lateral signal lines is arranged in the second non-display region NA2, to achieve a relative short wound line and thus achieve a relatively small area occupied by the relatively short wound line. In this way, the second non-display region NA2 has a frame with a relatively large width. The solution to achieve the electrical connection between the lateral signal lines disconnected by the through-hole will be described in the following embodiments.

In some embodiments, as shown in FIG. 4, a diameter of the third through-hole K3 is smaller than a diameter of the first through-hole K1 and is also smaller than a diameter of the second through-hole K2, and the first through-hole K1 and the second through-hole K2 can have different diameters or a same diameter. A length of a region occupied by the first non-display region NA1 and two through-holes in the second direction y is $d_6$, and a length of a region occupied by the second non-display region NA2 and the third through-hole K3 is in the second direction y is $d_7$. In order to realize the electrical connection between the lateral signal lines disconnected by the through-hole and minimize the length of the wound line and the area occupied by the wound line, the wound line is arranged in the second non-display region NA2. In certain embodiments, the diameter of the third through-hole K3 is set to be the smallest, which is beneficial to reduce the difference between $d_6$ and $d_7$, and even realize $d_6=d_7$, which can improve the display visual effect.

Figure 5:
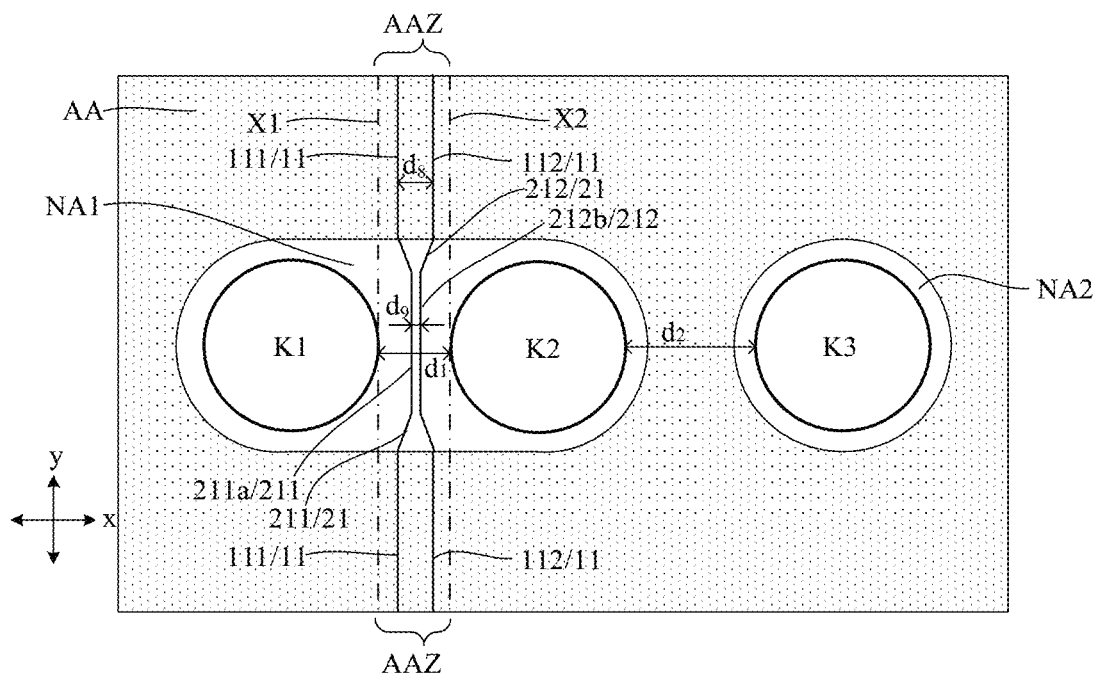
FIG. 5 is another partial schematic diagram of a display panel according to some embodiments of the present disclosure.

FIG. 5 is another partial schematic diagram of a display panel provided by some embodiments of the present disclosure. In some embodiments, as shown in FIG. 5, the first connection lines 21 include a first connection sub-line 211 and a second connection sub-line 212 adjacent to the first connection sub-line 211, the fourth signal lines 11 includes a first signal sub-line 111 and a second signal sub-line 112 adjacent to the first signal sub-line 111, the first signal sub-line 111 is electrically connected to the first connection sub-line 211, and the second signal sub-line 112 is connected to the second connection sub-line 212. The first connection sub-line 211 includes a first line sub-segment 211a, the second connection sub-line 212 includes a second line sub-segment 212b, and the first line sub-segment 211a and the second line sub-segment 212b are adjacent to each other. In the first direction x, a distance $d_8$ between the first signal sub-line 111 and the second signal sub-line 112 and a distance $d_9$ between the first line sub-segment 211a and the second line sub-segment 212b satisfy: $d_8>d_9$. With such a configuration, the distance between two adjacent first connection lines 21 in the first non-display region NA1 can be reduced, thereby reducing a total width of the first connection lines 21 in the first direction x. In an aspect, it is beneficial to reduce the distance $d_1$ between the first through-hole K1 and the second through-hole K2. In another aspect, a larger space can be reserved between the first connection line 21 and the first through-hole K1, or between the first connection line 21 and the second through-hole K2, which facilitates wiring in the first non-display region NA1.

Figure 6:
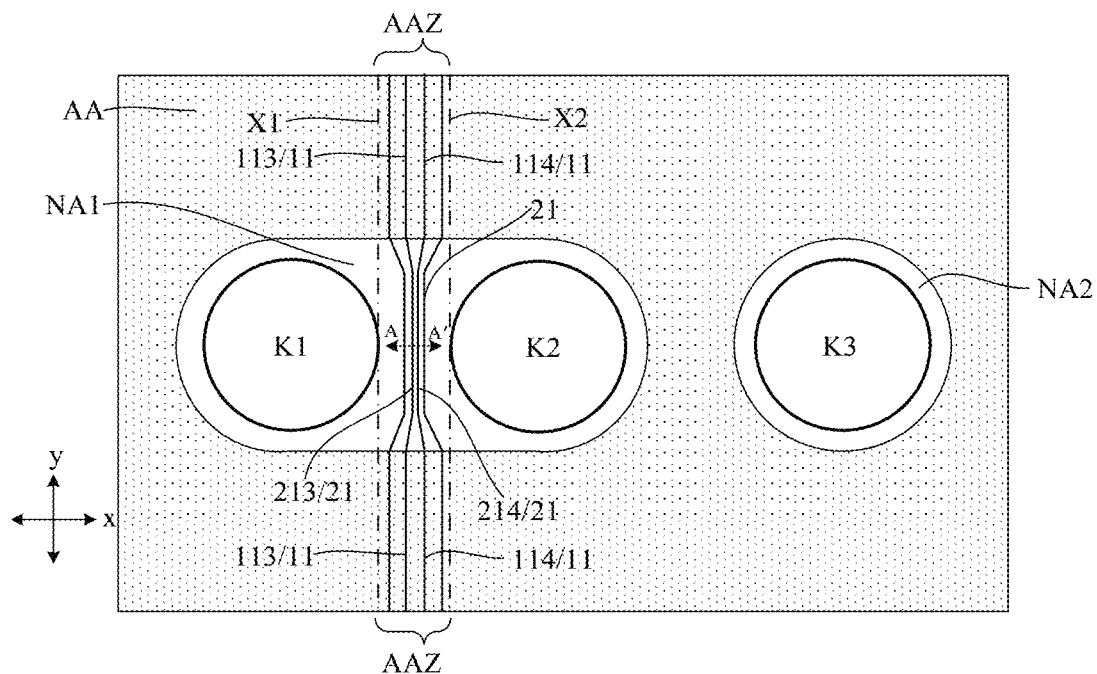
FIG. 6 is another partial schematic diagram of a display panel according to some embodiments of the present disclosure.
Figure 7:
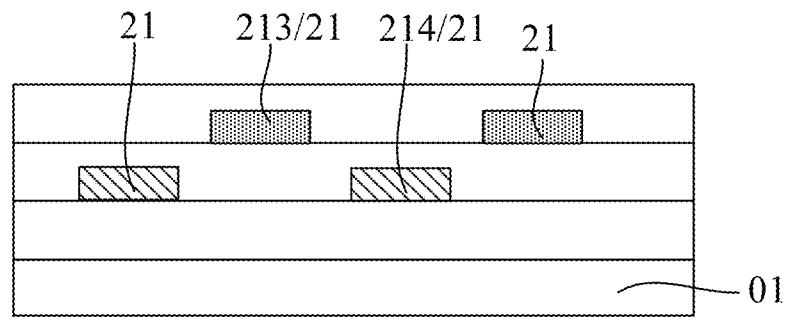
FIG. 7 is a cross-sectional view along A-A' shown in FIG. 6 according to an embodiment of the present disclosure.

FIG. 6 is another partial schematic diagram of a display panel according to some embodiments of the present disclosure, and FIG. 7 is a cross-sectional view along A-A' shown in FIG. 6. In some embodiments, as shown in FIG. 6, the first connection lines 21 include a third connection sub-line 213 and a fourth connection sub-line 214. The fourth signal lines 11 include a third signal sub-line 113 and a fourth signal sub-line 114. The third signal sub-line 113 is electrically connected to the third connection sub-line 213, and the fourth signal sub-line 114 is electrically connected to the fourth connection sub-line 214. As shown in FIG. 7, the display panel includes a substrate 01, the third connection sub-line 213 and the fourth connection sub-line 214 are located in different layers that are located on the substrate 01, and an insulating layer is provided between the layer where the third connection sub-line 213 is located and the layer where the fourth connection sub-line 214 is located. Such a configuration can reduce the distance between adjacent first connection lines 21 in the first direction x, thereby reducing a total width occupied by the first connection lines 21 located between the first through-hole K1 and the second through-hole K2. In an embodiment, it is beneficial to reduce the distance $d_1$ between the first through-hole K1 and the second through-hole K2, and in embodiment aspect, a larger space can be reserved between the first connection line 21 and the first through-hole K1, or between the first connection line 21 and the second through-hole K2, which facilitates wiring in the first non-display region NA1.

In the embodiments of FIG. 7, two metal layers are used to form the first connection lines 21. In other embodiments, the first connection lines 21 include three connection sub-lines respectively located in three different layers. That is, the first connection lines 21 are formed in three metal layers, so that a total width of the first connection lines 21 located between the first through-hole K1 and the second through-hole K2 can be reduced.

In some embodiments, the third connection sub-line 213 and the fourth connection sub-line 214 that are located in different layers at least partially overlap with each other, so that a total width of the first connection lines 21 located between the first through-hole K1 and the second through-hole K2 can be reduced.

Figure 8:
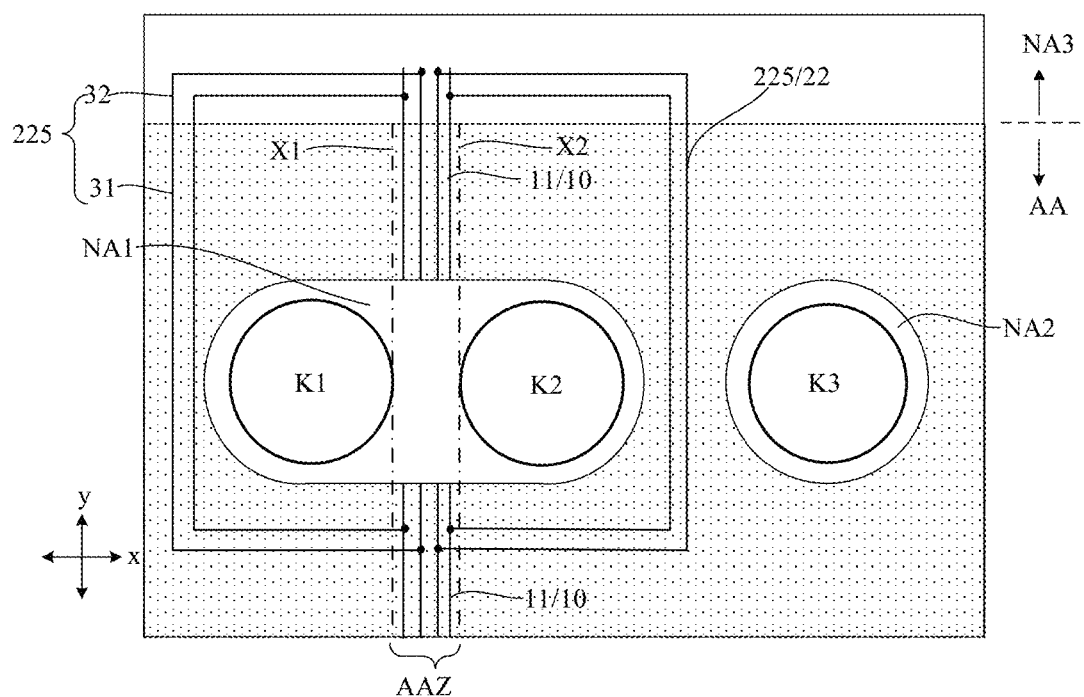
FIG. 8 is another partial schematic diagram of a display panel according to some embodiments of the present disclosure.

In other embodiments, the display panel includes a first-type second connection line, and at least a line segment of the line segments of the first-type second connection line is located in the display region, and another line segment of the line segments of the first-type second connection line is located in the non-display region. FIG. 8 is another partial schematic diagram of a display panel according to some embodiments of the present disclosure. As shown in FIG. 8, the non-display region includes a third non-display region NA3, and the third non-display region NA3 is located at a side of the middle region AAZ that is away from the first non-display region NA1. The second connection line 22 includes a fifth connection sub-line 225, and the fifth connection sub-line 225 includes a first line segment 31 and a second line segment 32 that are connected to each other. The first line segment 31 is located in the display region AA, and the second line segment 32 is located in the third non-display regions NA3. The first line segment 31 has an end connected to the fourth signal line 11 in one middle region AAZ, and the second line segment 32 has an end connected to the fourth signal line 11 in another one middle region AAZ. In certain embodiments, the fifth connection sub-line 225 connects the two fourth signal lines 11 located in the two middle regions AAZ, and a line segment of the line segments of the fifth connection sub-line 225 is located in the third non-display region NA3 and another line segment of the line segments of the fifth connection sub-line 225 is located in the display region AA. The fifth connection sub-line 225 does not occupy the space of the first non-display region NA1 around the first through-hole K1 and the second through-hole K2, thereby ensuring that the electrical connection between the two fourth signal lines 11 configured to drive the pixel circuits in a same column, and thus reducing an area of a region occupied by the first non-display region NA1, the first through-hole K1, and the second through-hole K2, and improving the symmetry of the region capable of displaying images at two sides of the symmetry axis extending in the second direction y.

Referring to FIG. 1, in the second direction y, the three through-holes are located at an upper part of the display panel, and the three through-holes are closer to the non-display region at the upper part of the display panel. In the embodiments of FIG. 8, the third non-display region NA3 is a non-display region that is relatively closer to the three through-holes in the second direction y, to balance an entire length of the fifth connection sub-line 225 and a length of the first line segment 31 in the display region AA. In an aspect, the total length of the fifth connection sub-line 225 is increased, thereby increasing the load of the fourth signal line 11 to compensate the influence of the lack of pixels in the first non-display region NA1 on the load of the fourth signal line 11. In another aspect, the length of the first line segment 31 arranged in the display region AA is not too long, thereby reducing the reflection of the ambient light by the first line segment 31 and thus improving the display effect.

In some embodiments, as shown in FIG. 8, the second connection line 22 has a shape approximate to a U-shaped line, and the second connection line 22 is wound around the first non-display region NA1, to electrically connect two fourth signal lines 11 located at two sides of the first non-display region NA1.

Figure 9:
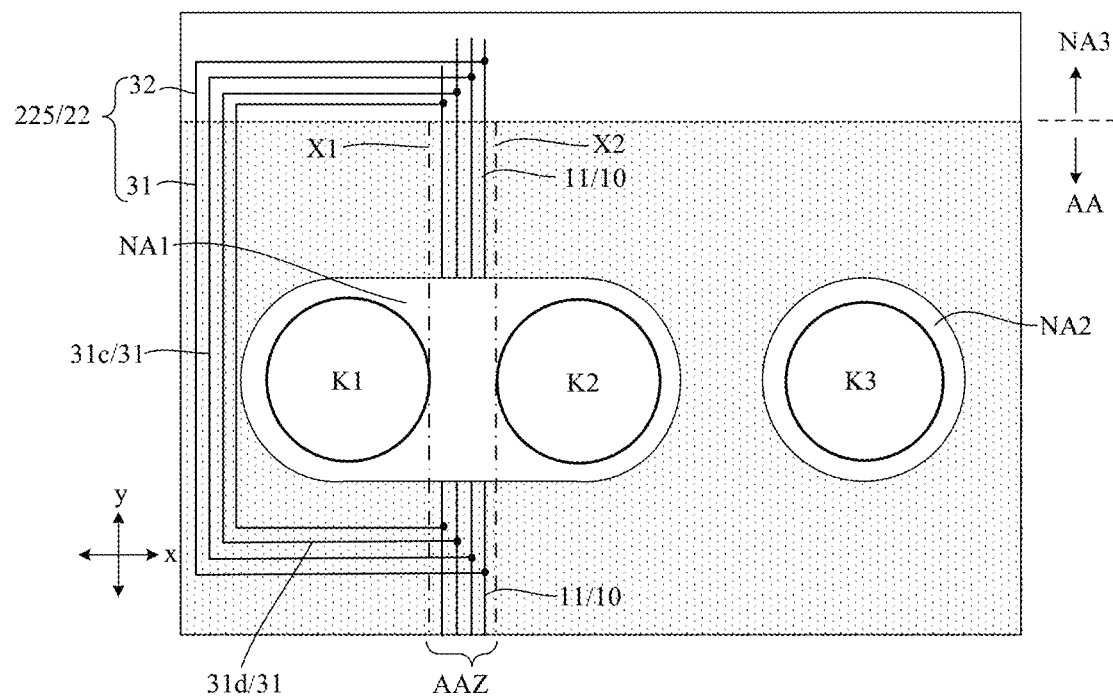
FIG. 9 is another partial schematic diagram of a display panel according to some embodiments of the present disclosure.

FIG. 9 is another partial schematic diagram of a display panel provided by some embodiments of the present disclosure. In some embodiments, as shown in FIG. 9, the first line segment 31 includes a third line sub-segment 31c extending along the second direction y, and at least one third line sub-segment 31c is located in a region of the display region AA that is located at a side of the first through-hole K1 away from the second through-hole K2. In other words, the first line segment 31 of the second connection line 22 is wound in a region of the display region AA that is located at a side of the first through-hole K1 away from the second through-hole K2, and is then connected to the fourth signal line 11 located in the middle region AAZ. As shown in FIG. 9, the first line segment 31 further includes a fourth line sub-segment 31d extending along the first direction x, the fourth line sub-segment 31d is connected to the third line sub-segment 31c, and the fourth line sub-segment 31d is electrically connected to the fourth signal line 11 in the middle region AAZ. In certain embodiments, the first line segment 31 is wound in a region of the display region AA that is located at a side of the first through-hole K1 away from the second through-hole K2, so that a length of the fourth line sub-segment 31d is relatively short, thereby reducing the overall length of the first line segment 31, and thus reducing the reflection of the ambient light by the first line segment 31.

In some embodiments, the first line segments 31 of all second connection lines 22 are wound in a region of the display region AA that is located at a side of the first through-hole K1 away from the second through-hole K2, and the first line segments 31 are concentrated in a local region of the display region. With such a configuration, the first line segment 31 does not occupy the space of the display region AA at a side of the second through-hole K2 away from the first through-hole K1, thereby improving the freedom of wiring in the display region AA. For example, other functional wirings can be arranged in the space of the display region AA located at the side of the second through-hole K2 away from the first through-hole K1 according to design requirements.

Figure 10:
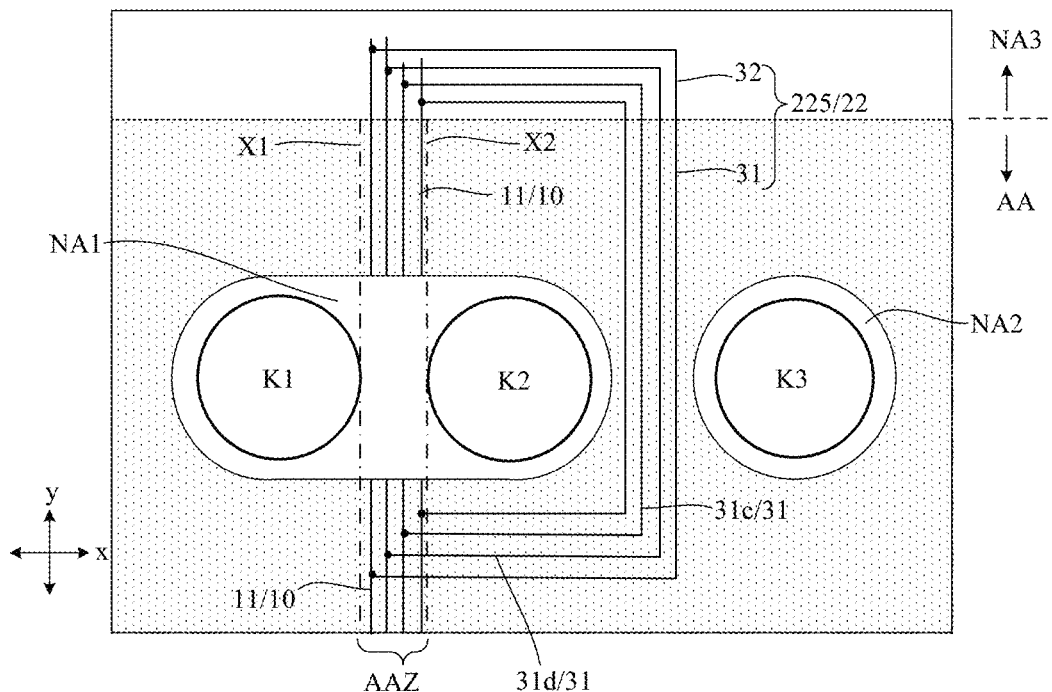
FIG. 10 is another partial schematic diagram of a display panel according to some embodiments of the present disclosure.

FIG. 10 is another partial schematic diagram of a display panel provided by some embodiments of the present disclosure. In other embodiments, as shown in FIG. 10, the first line segment 31 includes a third line sub-segment 31c extending along the second direction y and a fourth line sub-segment 31d extending along the first direction x, and the fourth line sub-segment 31d is connected to the third line sub-segment 31c and is electrically connected to the fourth signal line 11 in the middle region AAZ. At least one third line sub-segment 31c is located in the display region AA between the second through-hole K2 and the third through-hole K3. In other words, the first line segment 31 of the second connection line 22 is wound in the region of the display region AA located at a side of the second through-hole K2 away from the first through-hole K1, and is then connected to the fourth signal line 11 located in the middle region AAZ. With such a configuration, the length of the fourth line sub-segment 31d is relatively short, thereby reducing a total length of the first line segment 31, and thus reducing the reflection of the ambient light by the first line segment 31.

In some embodiments, all the first line segments 31 of the second connection lines 22 are wound in the region of the display region AA located between the third through-hole K3 and the second through-hole K2. Compared with the entire display region AA, an area of the region of the display region that is located between the third through-hole K3 and the second through-hole K2 in the first direction x is relatively small, and the first line segments 31 are concentrated in a local region located between the third through-hole K3 and the second through-hole K2, so that the reflection of the ambient light by the first line segment 31 has little effect on the display effect of the overall display region.

Figure 11:
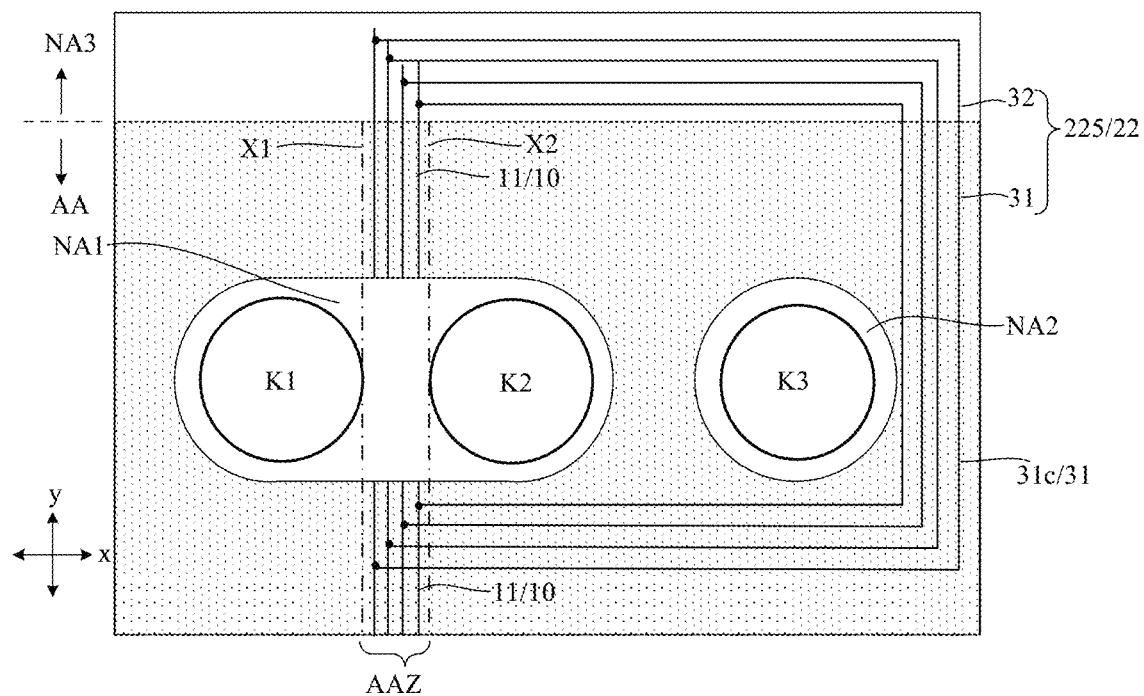
FIG. 11 is another partial schematic diagram of a display panel according to some embodiments of the present disclosure.

FIG. 11 is another partial schematic diagram of a display panel provided by some embodiments of the present disclosure. In other embodiments, as shown in FIG. 11, the first line segment 31 includes a third line sub-segment 31c extending along the second direction y, and at least one third line sub-segment 31c is located in the region of the display region AA located at a side of the third through-hole K3 away from the second through-hole K2. In certain embodiments, the second connection line 22 does not occupy the space of the first non-display region NA1 around the first through-hole K1 and the second through-hole K2, thereby ensuring the electrical connection between the two fourth signal lines 11 configured to drive the pixel circuits in a same column. The area of the region occupied by the first non-display region NA1, the first through-hole K1, and the second through-hole K2 can be reduced, and the display visual effect can be improved. With such a configuration, a total length of the fifth connection sub-line 225 can be increased, thereby increasing the load of the fourth signal line 11, and compensating an influence of the lack of pixels in the first non-display region NA1 on the load of the fourth signal line 11.

In some embodiments, as shown in FIG. 8, the first line segment 31 of at least one second connection line 22 is wound in the region of the display region AA that is located at the side of the first through-hole K1 away from the second through-hole K2, and the first line segment 31 of another at least one second connection line 22 is wound in the region of the display region AA located at the side of the second through-hole K2 away from the first through-hole K1. In other words, the first line segments 31 are wound in the display region AA at two sides of the first non-display region NA1. With such a configuration, it can avoid that the density of local metal patterns is too high due to the concentrated arrangement of the first line segments 31. When the first line segments 31 are dispersedly arranged, the density difference of the metal patterns at different positions in the display region AA can be reduced to a certain extent, to reduce reflectivity difference and improve the display effect. A length difference of the second connection lines 22 that are wound in the region of the display region AA located at two sides of the first non-display region NA1 is not large, so that a difference between the loads of the fourth signal lines 11 is relatively small, and the display split screen phenomenon can be avoided.

Figure 12:
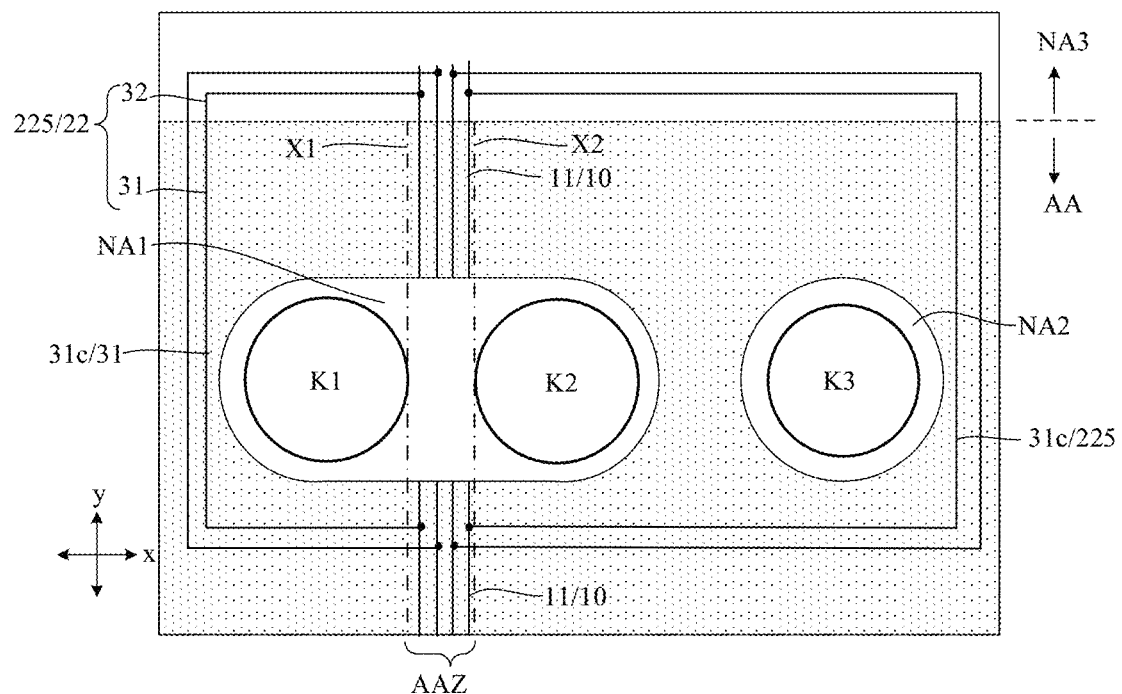
FIG. 12 is another partial schematic diagram of a display panel according to some embodiments of the present disclosure.

FIG. 12 is another partial schematic diagram of a display panel provided by some embodiments of the present disclosure. In other embodiments, as shown in FIG. 12, the first line segment 31 of at least one second connection line 22 is wound in a region of the display region AA that is located at a side of the first through-hole K1 away from the second through-hole K2, and the first line segment 31 of another at least one second connection line 22 is wound in a region of the display region AA that is located at a side of the third through-hole K3 away from the second through-hole K2.

Figure 13:
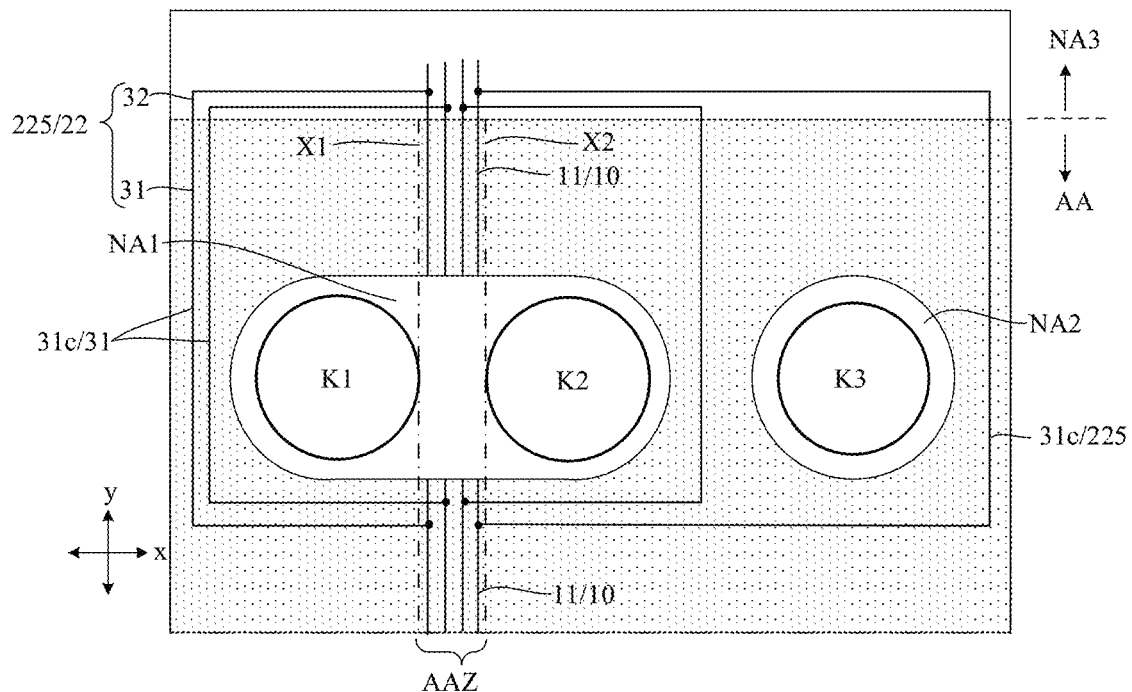
FIG. 13 is another partial schematic diagram of a display panel according to some embodiments of the present disclosure.

FIG. 13 is another partial schematic diagram of a display panel provided by some embodiments of the present disclosure. In other embodiments, as shown in FIG. 13, the first line segment 31 of at least one second connection line 22 is wound in a region of the display region AA that is located at a side of the first through-hole K1 away from the second through-hole K2, the first line segment 31 of another at least one second connection line 22 is wound in a region of the display region AA that is located at a side of the second through-hole K2 away from the first through-hole K1, and the first line segment 31 of still another at least one second connection line 22 is wound in a region of the display region AA that is located at a side of the third through-hole K3 away from the second through-hole K2.

In some embodiments, the number $m_1$ of the third line sub-segments 31c located in a region of the display region AA that is located at a side of the first through-hole K1 away from the second through-hole K2 and the number $m_2$ of the third line sub-segments 31c located in a region of the display region AA that is located at a side of the second through-hole K2 away from the first through-hole K1 satisfy: $|m_1-m_2|\leq 1$, where both $m_1$ and $m_2$ are positive integers. The third line sub-segments 31c located in a region of the display region AA that is located at a side of the second through-hole K2 away from the first through-hole K1 include a third line sub-segment 31c located in a region of the display region AA that is located between the second through-hole K2 and the third through-hole K3 and/or a third line sub-segment 31c located in a region of the display region AA located at a side of the third through-hole K3 away from the second through-hole K2. With the configuration where $|m_1-m_2|\leq 1$, a difference between the number of the first line segments 31 located at a side of the middle region AAZ in the first direction x and the number of the first line segments 31 located at another side of the middle region AAZ in the first direction x is small, and with the configuration where the first line segments 31 are arranged dispersedly, the density of metal patterns at different positions in the display region AA can be reduced to a certain extent, thereby reducing the difference in reflectivity and avoiding the display split screen phenomenon.

Figure 14:
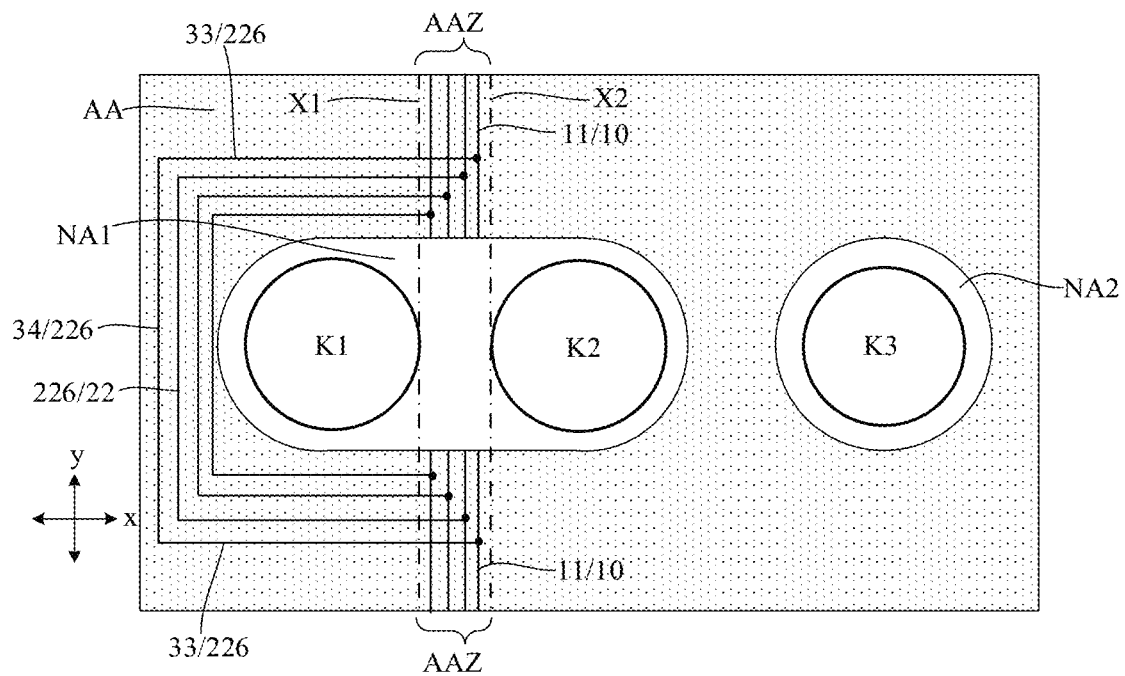
FIG. 14 is another partial schematic diagram of a display panel according to some embodiments of the present disclosure.

In other embodiments, the display panel includes second-type second connection lines, and all of the second-type second connection lines are located in the display region. FIG. 14 is another partial schematic diagram of a display panel provided by some embodiments of the present disclosure. As shown in FIG. 14, the second connection line 22 includes a sixth connection sub-line 226, and the sixth connection sub-line 226 includes a third line segment 33 extending along the first direction x and the fourth line segment 34 extending along the second direction y. Each of two ends of the fourth line segment 34 is connected to a respective one of two third line segments 33. The third line segment 33 and the fourth line segment 34 are both located in the display region AA, and each of the two third line segments 33 is connected to a respective of two fourth signal lines 11 located in the middle region AAZ. In certain embodiments, the sixth connection sub-line 226 is provided in the display region AA, and two fourth signal lines 11 located at two sides of the first non-display region NA1 are connected to each other by the sixth connection sub-line 226. The sixth connection sub-line 226 does not occupy the space of the first non-display region NA1 around the first through-hole K1 and the second through-hole K2, thereby ensuring the electrical connection between two fourth signal lines 11 configured to drive the pixel circuits in a same column, reducing the area of the region occupied by the first non-display region NA1, the first through-hole K1, and the second through-hole K2, and thus improving the symmetry of the region capable of displaying images at two sides of the symmetry axis extending in the second direction y.

As shown in FIG. 14, the fourth line segment 34 of at least one sixth connection sub-line 226 is located in a region of the display region AA that is located at a side of the first through-hole K1 away from the second through-hole K2. In certain embodiments, the sixth connection sub-line 226 is wound in a region of the display region AA that is located at a side of the first through-hole K1 away from the second through-hole K2, so that a total length of the sixth connection sub-line 226 is relatively small, thereby reducing the reflection of the ambient light by the sixth connection sub-line 226.

In some embodiments, all the sixth connection sub-lines 226 are wound in a region of the display region AA located at a side of the first through-hole K1 away from the second through-hole K2, and the sixth connection sub-lines 226 are concentrate in a local region of the display region. With such a configuration, the sixth connection sub-lines 226 does not occupy the space of a region of the display region AA that is located at a side of the second through-hole K2 away from the first through-hole K1, thereby improving the freedom of wiring in the display region AA. For example, other functional wires are arranged in the region of the display region AA located at the side of the second through-hole K2 away from the first through-hole K1.

Figure 15:
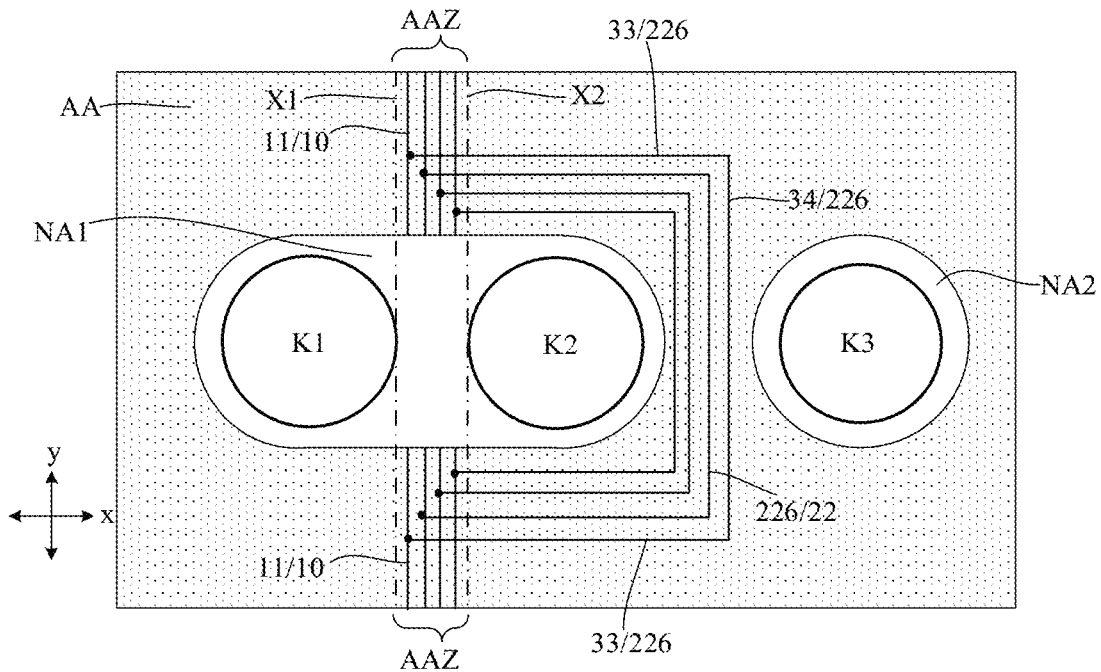
FIG. 15 is another partial schematic diagram of a display panel according to some embodiments of the present disclosure.

FIG. 15 is another partial schematic diagram of a display panel provided by some embodiments of the present disclosure. In other embodiments, as shown in FIG. 15, the fourth line segment 34 of at least one sixth connection sub-line 226 is located in a region of the display region located between the second through-hole K2 and the third through-hole K3. In certain embodiments, the sixth connection sub-line 226 is wound in the region of the display region AA located between the third through-hole K3 and the second through-hole K2, so that a total length of the sixth connection sub-line 226 is relatively small, thereby reducing the reflection of the ambient light by the six connection sub-lines 226. Compared with the entire display region AA, an area of the region of the display region located between the third through-hole K3 and the second through-hole K2 in the first direction x is relatively small, and the sixth connection sub-lines 226 are concentrated in the a local region between the third through-hole K3 and the second through-hole K2, and the reflection of the ambient light by the sixth connection sub-line 226 has little effect on the display effect of the overall display region.

In some embodiments, all the sixth connection sub-lines 226 are wound in the region of the display region AA that is located between the third through-hole K3 and the second through-hole K2.

Figure 16:
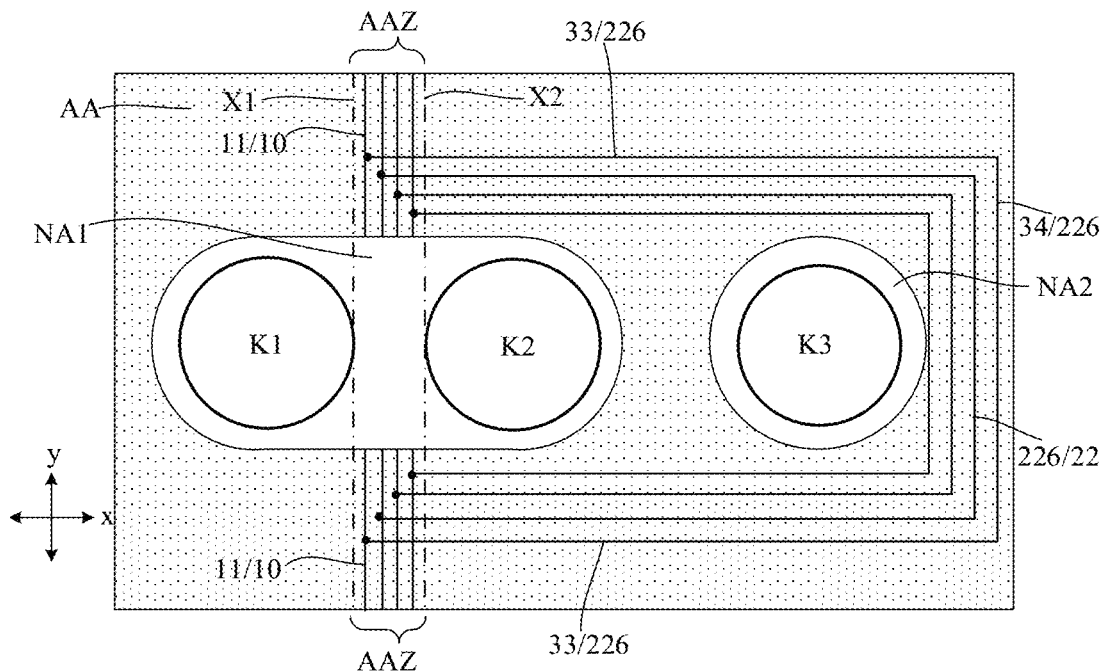
FIG. 16 is another partial schematic diagram of a display panel according to some embodiments of the present disclosure.

FIG. 16 is another partial schematic diagram of a display panel provided by some embodiments of the present disclosure. In other embodiments, as shown in FIG. 16, the fourth line segment 34 of at least one sixth connection sub-line 226 is located in a region of the display region AA that is located at a side of the third through-hole K3 away from the second through-hole K2. In certain embodiments, the sixth connection sub-line 226 is located in the display region AA, and does not occupy the space of the region of the first non-display region NA1 around the first through-hole K1 and the second through-hole K2, thereby ensuring the electrical connection between the fourth signal lines 11 configured to drive the pixel circuits in a same column, and reducing an area of the region occupied by the first non-display region NA1, the first through-hole K1, and the second through-hole K2, and thus improving the display visual effect. In this way, a total length of the sixth connection sub-line 226 is increased, thereby increasing the load of the fourth signal line 11, and compensating the influence of the lack of pixels in the first non-display region NA1 on the load of the fourth signal line 11.

Figure 17:
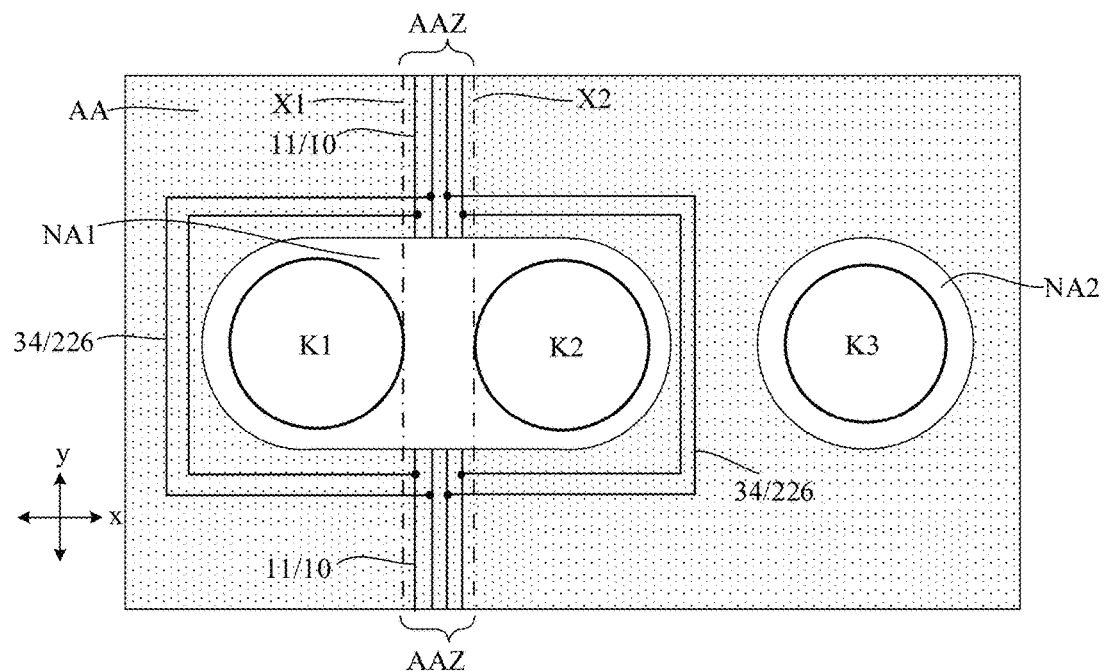
FIG. 17 is another partial schematic diagram of a display panel according to some embodiments of the present disclosure.

FIG. 17 is another partial schematic diagram of a display panel provided by some embodiments of the present disclosure. In some embodiments, as shown in FIG. 17, the fourth line segment 34 of the sixth connection sub-line 226 is located in a region of the display region AA that is located at a side of the first through-hole K1 away from the second through-hole K2, and the fourth line segment 34 of another at least one sixth connection sub-line 226 is located in a region of the display region AA that is located between the second through-hole K2 and the third through-hole K3. In certain embodiments, the sixth connection sub-lines 226 are dispersedly arranged, which can prevent the density of the local metal patterns from being too large due to the concentrated arrangement of the sixth connection sub-lines 226. With the configuration where the sixth connection sub-lines 226 are dispersedly arranged, the density difference of metal patterns at different positions of the display region AA can be reduced, thereby reducing the difference in reflectivity and improving the display effect. A difference of the lengths of the sixth connection sub-lines 226 that are wound in the region of the display region AA located at two sides of the first non-display region NA1 is not large, so that a difference of the loads of all fourth signal lines 11 is relatively small, which can avoid the display split screen phenomenon.

In other embodiments, the fourth line segment 34 of at least one sixth connection sub-line 226 is located in the region of the display region AA located at the side of the first through-hole K1 away from the second through-hole K2, and the fourth line segment 34 of another at least one sixth connection sub-line 226 is located in the region of the display region AA that is located at the side of the third through-hole K3 away from the second through-hole K2, which is not shown in the drawings herein.

Figure 18:
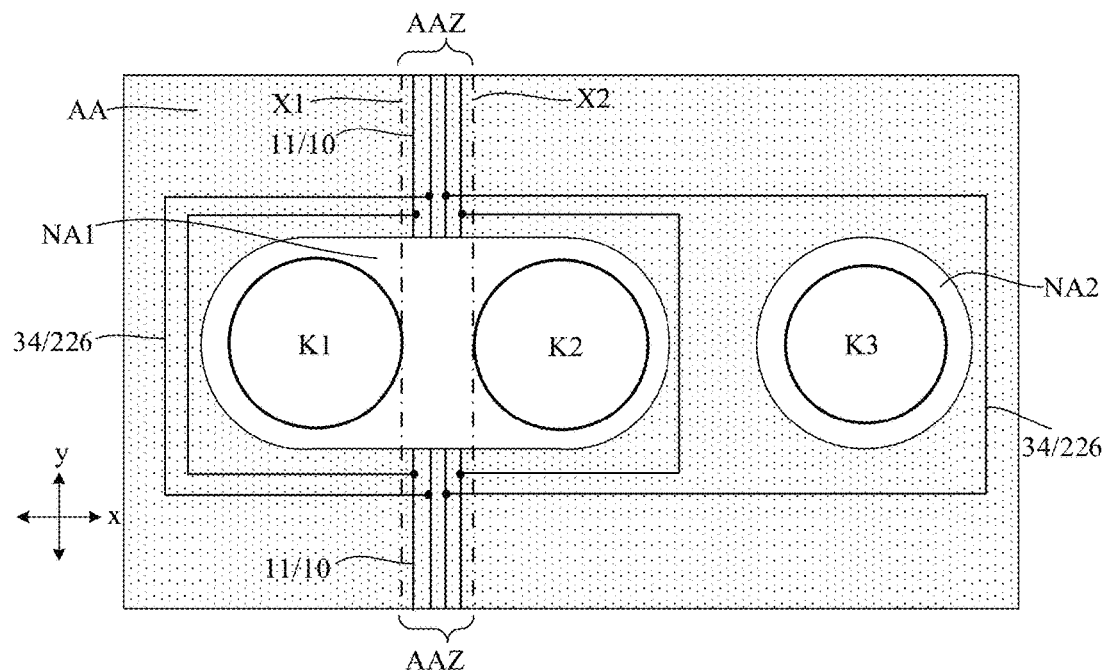
FIG. 18 is another partial schematic diagram of a display panel according to some embodiments of the present disclosure.

FIG. 18 is another partial schematic diagram of a display panel provided by some embodiments of the present disclosure. In some embodiments, as shown in FIG. 18, the fourth line segment 34 of at least one sixth connection sub-line 226 is located in the region of the display region AA that is located at the side of the first through-hole K1 away from the second through-hole K2, and the fourth line segment 34 of another at least one sixth connection sub-line 226 is located in the region of the display region AA that is located between the second through-hole K2 and the third through-hole K3, the fourth line segment 34 of still another at least one sixth connection sub-line 226 is located in the region of the display region AA that is located at a side of the third through-hole K3 away from the second through-hole K2.

In some embodiments, the number $m_3$ of the fourth line segments 34 located in the region of the display region AA that is located at the side of the first through-hole K1 away from the second through-hole K2 and the number $m_4$ of the fourth line segments 34 located in the region of the display region AA that is located at the side of the second through-hole K2 away from the first through-hole K1 satisfy: $|m_3-m_4|\leq1$, where both $m_3$ and $m_4$ are positive integers. The fourth line segments 34 located in the region of the display region AA that is located at the side of the second through-hole K2 away from the first through-hole K1 include the fourth line segment 34 located between the second through-hole K2 and the third through-hole K3 and/or the fourth line segment 34 located in the region of the display region AA that is located at a side of the through-hole K3 away from the second through-hole K2. With the configuration where $|m_3-m_4|<1$, a difference of the number of the sixth connection sub-lines 226 located at one side of the middle region AAZ in the first direction x and the number of the sixth connection sub-lines 226 located at another one side of the middle region AAZ in the first direction x is small, and the configuration where the sixth connection sub-lines 226 are dispersedly arranged can reduce the difference in density of metal patterns at different positions of the display region AA, thereby reducing the difference in reflectivity and improving the display effect.

Figure 19:
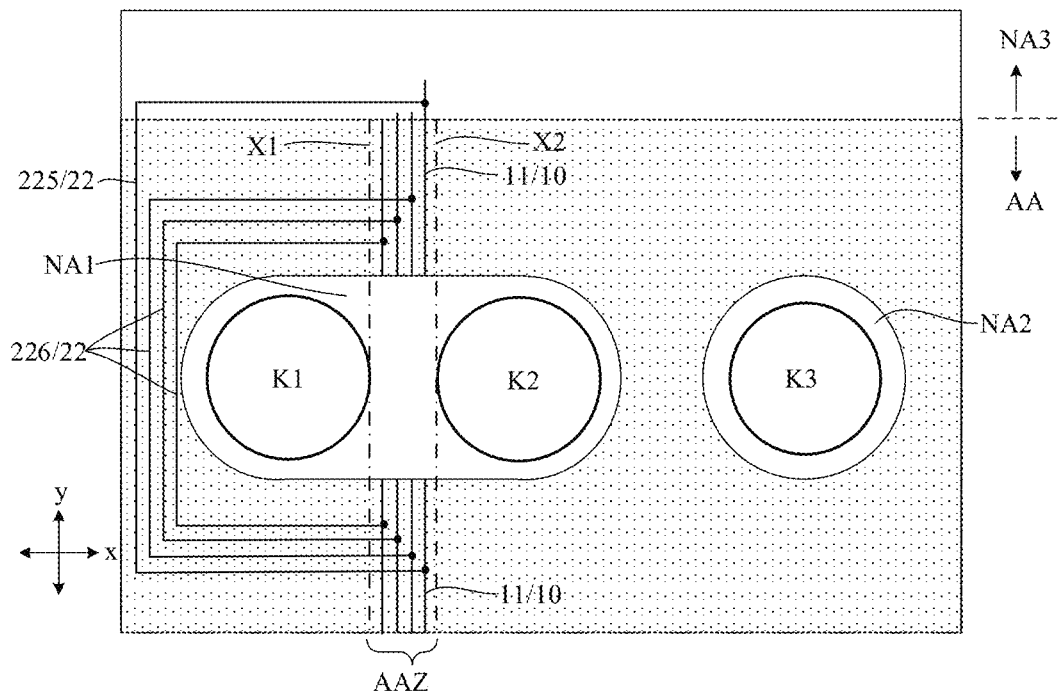
FIG. 19 is another partial schematic diagram of a display panel according to some embodiments of the present disclosure.
Figure 20:
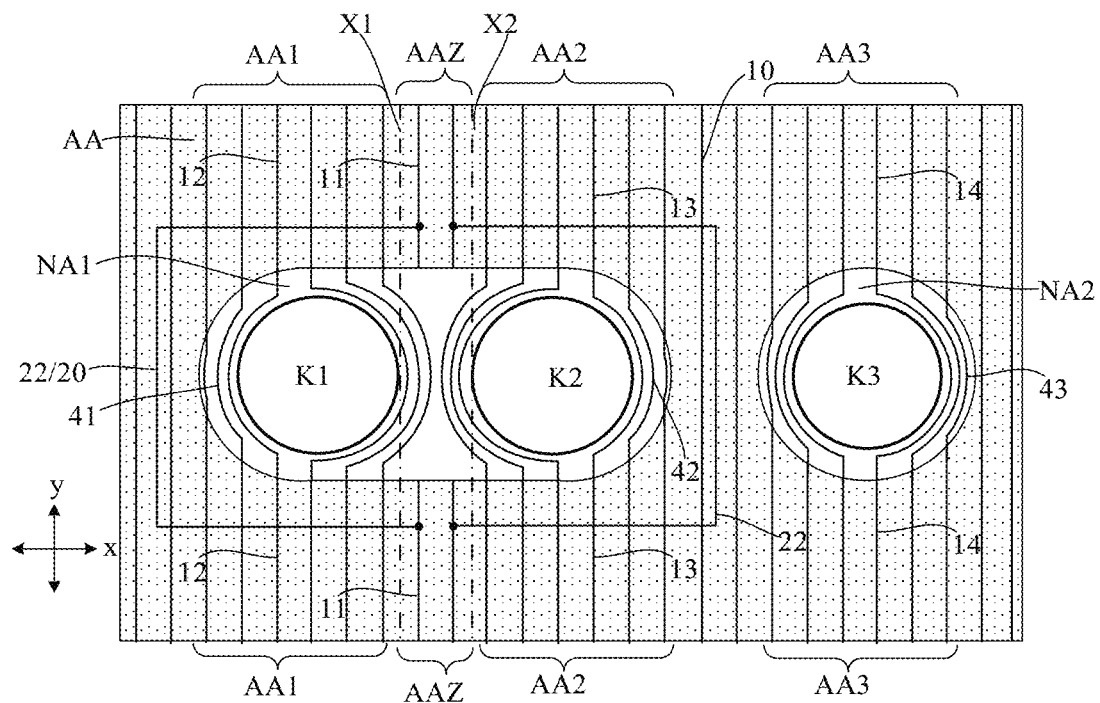
FIG. 20 is another partial schematic diagram of a display panel according to some embodiments of the present disclosure.

In other embodiments, the display panel includes a fifth connection sub-line 225 and a sixth connection sub-line 226. FIG. 19 is another partial schematic diagram of a display panel according to some embodiments of the present disclosure. As shown in FIG. 19, the second connection lines 22 include a fifth connection sub-line 225 and a sixth connection sub-line 226. At least one line segment of the line segments of the fifth connection sub-line 225 is located in the third non-display region NA3, and another at least one line segment of the line segments of the fifth connection sub-line 225 is located in the display region AA. The sixth connection sub-line 226 is entirely located in the display region AA. The number of the fifth connection sub-lines 225 is smaller than the number of the sixth connection sub-lines 226. Referring to FIG. 1, in the second direction y, the three through-holes are located at an upper part of the display panel, and the three through-holes are closer to the non-display region at an upper part of the display panel. In the embodiments of FIG. 19, the third non-display region NA3 is a non-display region with a relatively short distance from the three through-holes in the second direction y. When there is not enough space of the region of the display region AA that is located between the first non-display region NA1 and the third non-display region NA3, the sixth connection sub-line 226 is arranged in the region of the display region AA that is located between the first non-display region NA1 and the third non-display region NA3, while at least one line segment of the line segments of the fifth connection sub-line 225 is arranged in the third non-display region NA3 to ensure the electrical connection between the fourth signal lines 11 located at two sides of the first non-display region NA1. Since the distance between the third non-display region NA3 and each of the three through-holes is relatively small, the difference between the length of the fifth connection sub-line 225 and the length of the sixth connection sub-line 226 in the embodiments of FIG. 20 is relatively small, so that the difference between the loads of the fourth signal line 11 is relatively small. The number of the fifth connection sub-lines 225 is smaller than the number of the sixth connection sub-lines 226. That is, the fifth connection sub-lines 225 are first considered to be arranged in the display region AA, thereby reducing an influence of the sixth connection sub-lines 226 on the width of the frame.

The embodiments of FIG. 19 only illustrate that the fifth connection sub-line 225 and the sixth connection sub-line 226 are wound at a side of the first through-hole K1 away from the second through-hole K2 for illustration.

In the embodiments of the present disclosure, the second connection lines 22 include a fifth connection sub-line 225 and a sixth connection sub-line 226. The fifth connection sub-line 225 may be wound at a side of the first through-hole K1 away from the second through-hole K2, or be wound between the third through-hole K3 and the second through-hole K2, or be wound at a side of the third through-hole K3 away from the second through-hole K2. The sixth connection sub-line 226 may be wound at a side of the first through-hole K1 away from the second through-hole K2, or be wound between the third through-hole K3 and the second through-hole K2, or be wound at a side of the third through-hole K3 away from the second through-hole K2.

FIG. 20 is another partial schematic diagram of a display panel according to some embodiments of the present disclosure. In some embodiments, as shown in FIG. 20, the number of the first wound lines 41 located at one side of the first through-hole K1 is equal to the number of the first wound lines 41 located at another one side of the first through-hole K1, and/or, the number of the second wound lines 42 located at one side of the second through-hole K2 is equal to the number of the second wound lines 42 located at another one side of the second through-hole K2. The number of the first wound lines 41 located at one side of the first through-hole K1 is equal to the number of the first wound lines 41 located at another one side of the first through-hole K1, so that a difference between the lengths of different first wound lines 41 can be reduced, and a difference between loads of the first signal lines 12 can be reduced, thereby improving the brightness uniformity of the first display region AA1. The number of the second wound lines 42 located at one side of the second through-hole K2 is equal to the number of the second wound lines 42 located at another one side of the second through-hole K2, so that a difference between the lengths of different second wound lines 42 can be reduced, and a difference between the loads of the second signal lines 13 can be reduced, thereby improving the brightness uniformity of the second display region AA2.

Figure 21:
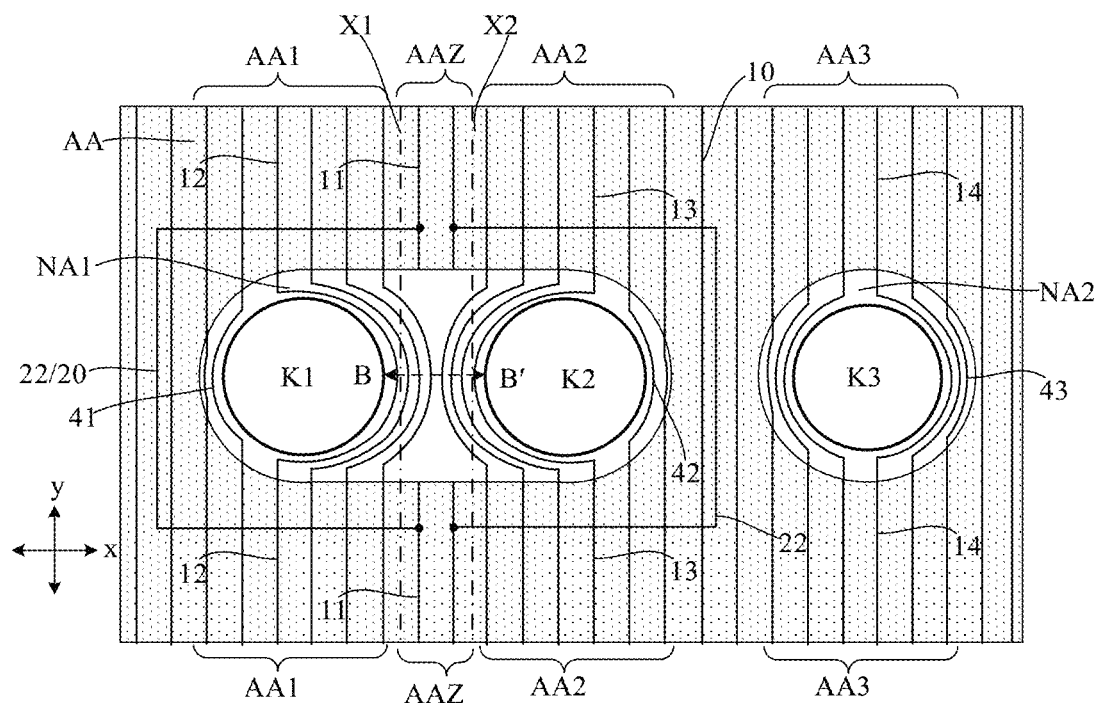
FIG. 21 is another partial schematic diagram of a display panel according to some embodiments of the present disclosure.

FIG. 21 is another partial schematic diagram of a display panel provided by some embodiments of the present disclosure. In other embodiments, as shown in FIG. 21, the number $n_1$ of the first wound lines 41 located at the side of the first through-hole K1 away from the second through-hole K2 and the number $n_2$ of the first wound lines 41 located at the side of the first through-hole K1 close to the second through-hole K2 satisfy: $n_1<n_2$; and/or, the number $n_3$ of the second wound lines 42 located at the side of the second through-hole K2 away from the first through-hole K1 and the number $n_4$ of the second wound lines 42 located at the side of the second through-hole K2 close to the first through-hole K1 satisfy: $n_3<n_4$. In certain embodiments, the number of the first wound lines 41 located at the side of the first through-hole K1 away from the second through-hole K2 is relatively small, and the number of the second wound lines 42 located at the side of the second through-hole K2 away from the first through-hole K1 is relatively small, and more first wound lines 41 and more second wound lines 42 are concentrated between the first through-hole K1 and the second through-hole K2, so that it is beneficial to reduce a width of the frame located at the side of the first through-hole K1 away from the second through-hole K2 and reduce a width of the frame located at the side of the second through-hole K2 away from the first through-hole K1, thereby improving the display visual effect.

In some embodiments, the first wound line 41 and the second wound line 42 are both located between the first through-hole K1 and the second through-hole K2. That is, no first wound line 41 is provided at the side of the first through-hole K1 away from the second through-hole K2, and no second wound line 42 is arranged at the side of the second through-hole K2 away from the first through-hole K1. Such a configuration can greatly reduce a width of the frame located at the side of the first through-hole K1 away from the second through-hole K2 and a width of the frame located at the side of the second through-hole K2 away from the first through-hole K1.

Figure 22:
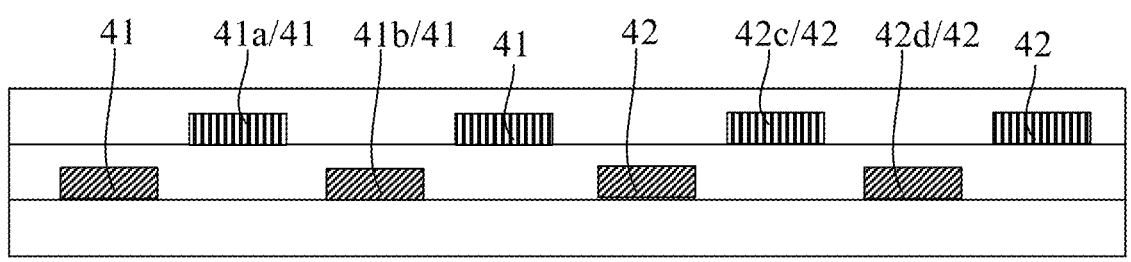
FIG. 22 is a cross-sectional view along B-B' shown in FIG. 21 according to an embodiment of the present disclosure.

FIG. 22 is a cross-sectional view along B-B' shown in FIG. 21. In some embodiments, as shown in FIG. 22, the first wound lines 41 include a first wound sub-line 41a and a second wound sub-line 41b that are located in different layers, the second wound lines 42 include a third wound sub-line 42c and a fourth wound sub-line 42d that are located in different layers. In some embodiments, the first wound sub-line 41a and the third wound sub-line 42c may be located in a same layer, and the second wound sub-line 41b and the fourth wound sub-line 42d may be located in a same layer. In certain embodiments, the first wound lines 41 are formed in two metal layers, and the second wound lines 42 are formed in two metal layers. Such a configuration can reduce the distance between adjacent first wound lines 41 in the first direction x and also can reduce the distance between adjacent second wound lines 42 in the first direction x, and thus a total width occupied by the first wound lines 41 that are located between the first through-hole K1 and the second through-hole K2 can be reduced, thereby reducing a distance $d_1$ between the first through-hole K1 and the second through-hole K2, and thus being beneficial to reduce a total length of the region formed by the first non-display region NA1, the first through-hole K1, and the second through-hole K2 in the first direction x, thereby improving the overall display effect.

In other embodiments, among the first wound lines 41 and the second wound lines 42, only the first wound lines 41 are formed in two metal layers. That is, the first wound lines 41 include the first wound sub-line 41a and the second wound sub-line 41b that are located in different layers.

In other embodiments, among the first wound lines 41 and the second wound lines 42, only the second wound lines 42 are formed in two metal layers. That is, the second wound lines 42 include the third wound sub-line 42c and the fourth wound sub-line 42d that are located in different layers.

In some embodiments, as shown in FIG. 20, the number of the third wound lines 43 located at one side of the third through-hole K3 is equal to the number of the third wound lines 43 located at another one side of the third through-hole K3. Such a configuration can reduce a difference between the lengths of different third wound lines 43, and can also reduce a difference between the loads of the third signal lines 14, thereby improving the brightness uniformity of the third display region AA3. It is beneficial to realize that the frame has a same width at two sides of the third through-hole K3, thereby improving the aesthetics.

In some embodiments, multiple third wound lines 43 are formed in two metal layers, thereby reducing a distance between adjacent third wound lines 43, thereby facilitating to reduce a width of the frame located in the second non-display region NA2, and thus improving the overall visual effect.

In other embodiments, at least one side of the through-hole in the first direction x, at least two of the number of the first wound lines 41 at a side of the first through-hole K1, the number of the second wound lines 42 at a side of the second through-hole K2, or the number of the third wound lines 43 at a side of the third through-hole K3 are different from each other. Taking the first direction x as the left and right direction of the three through-holes as an example, the number of the lines located at a left side of one through-hole of at least two through-holes of the three through-holes is different from the number of the lines located at a left side of another through-hole of at least two through-holes of the three through-holes, or the number of the lines located at a right side of one through-hole of at least two through-holes of the three through-holes is different from the number of the lines located at a right side of another through-hole of at least two through-holes of the three through-holes. Taking the embodiments of FIG. 21 as an example, at the left side of each of the three through-holes in the first direction x, the number of the third wound lines 43 located at the left side of the third through-hole K3 is greater than the number of the third wound lines 43 located at the left side of the first through-hole K1 and is smaller than the number of the second wound lines 42 located at the left side of the second through-hole K2. That is, at the left side in the first direction x, the number of the first wound lines 41 at a left side of the first through-hole K1, the number of the second wound lines 42 at a left side of the second through-hole K2, and the number of the third wound lines 43 at a left side of the third through-hole K3 are different from each other. In the embodiments of FIG. 22, at the right side in the first direction x, the number of the first wound lines 41 at a right side of the first through-hole K1, the number of the second wound lines 42 at a right side of the second through-hole K2, and the number of the third wound lines 43 at a right side of the third through-hole K3 are different from each other.

In some embodiments, at a same side of each of the through-holes in the first direction x, the number of the wound lines close to the first through-hole K1 or the number of the wound lines close to the second through-hole K2 can be greater than the number of the wound lines close to the third through-hole K3, or the number of the wound lines close to the first through-hole K1 or the number of the wound lines close to the second through-hole K2 can be smaller than the number of the wound lines close to the third through-hole K3.

The embodiments of the present disclosure can combine factors such as the size of the through-hole, the location of the through-holes in the display region AA, the number of signal lines disconnected by the through-holes in the second direction y, and the overall visual effect when the display region AA displays images, to make different designs on the number of the wound lines at a same side of each of the three through-holes in the first direction x. Reasonable wiring is arranged around the three through-holes to ensure the electrical connection between the longitudinal signal lines that are disconnected by the through-holes, thereby ensuring the overall visual effect and improving the aesthetics.

Figure 23:
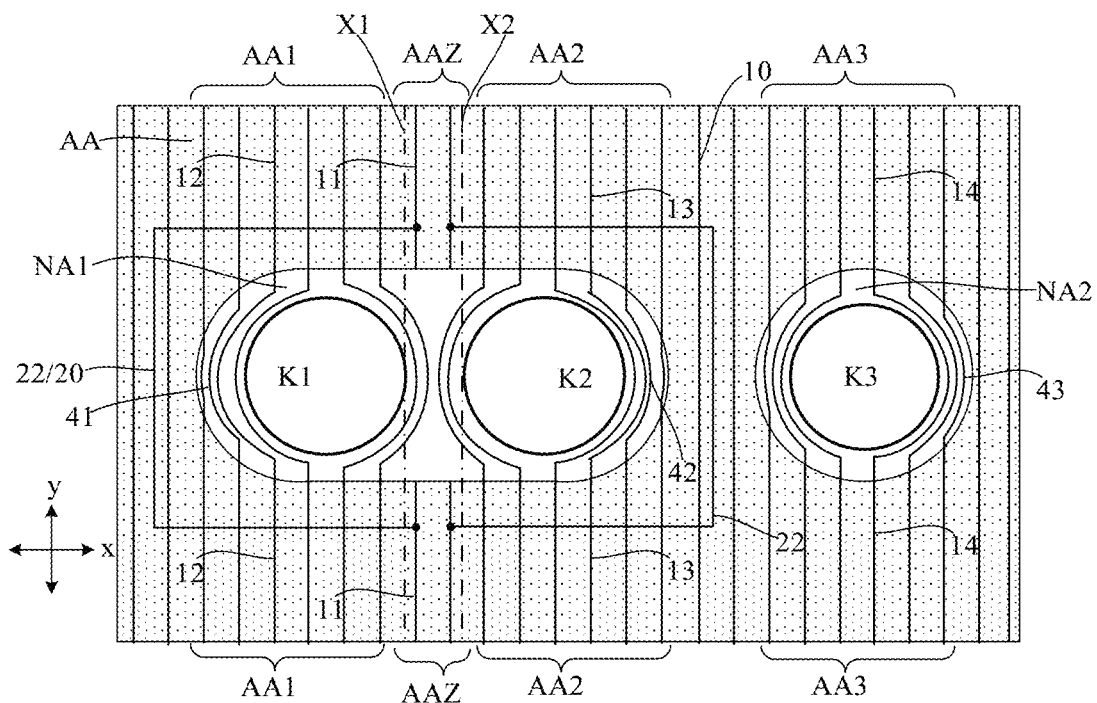
FIG. 23 is another partial schematic diagram of a display panel according to some embodiments of the present disclosure.

FIG. 23 is another partial schematic diagram of a display panel provided by some embodiments of the present disclosure. In some embodiments, as shown in FIG. 23, more first wound lines 41 are provided at the side of the first through-hole K1 away from the second through-hole K2, and more second wound lines 42 are provided at the side of the second through-hole K2 away from the first through-hole K1, so that a width of the region of the non-display region that is located between the second through-hole K2 and the first through-hole K1 can be reduced.

Figure 24:
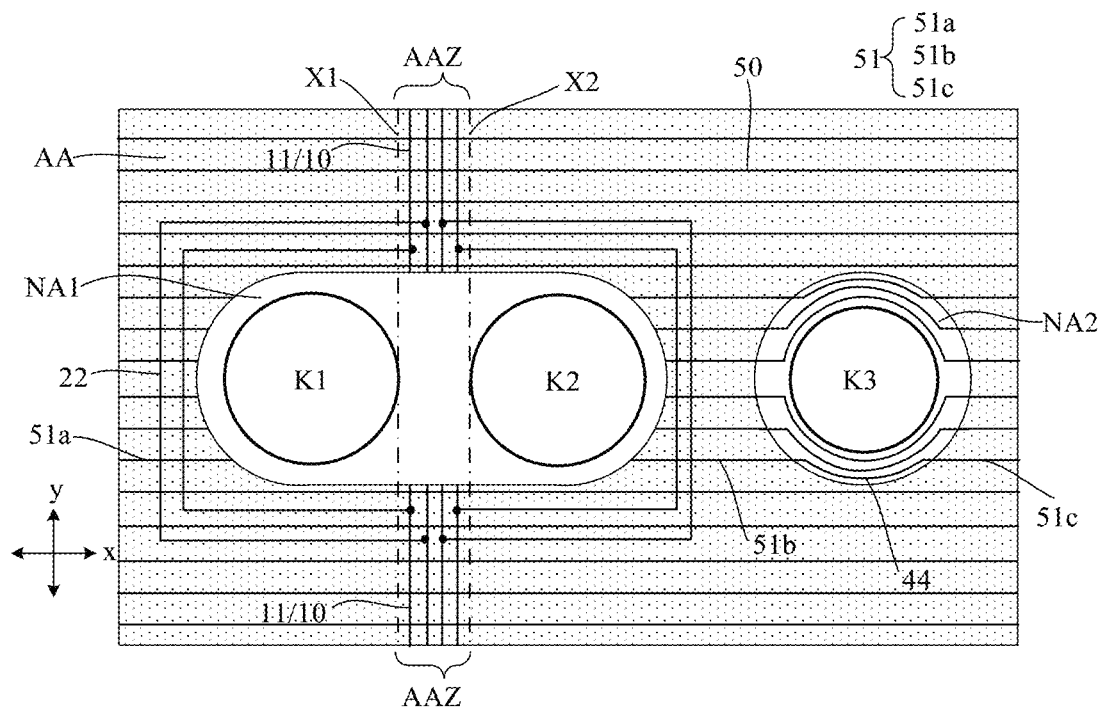
FIG. 24 is another partial schematic diagram of a display panel according to some embodiments of the present disclosure.

FIG. 24 is another partial schematic diagram of a display panel provided by some embodiments of the present disclosure. In some embodiments, as shown in FIG. 24, the display panel includes a lateral signal line 50 extending along the first direction x, and the lateral signal line 50 includes a first lateral signal line 51. The first lateral signal line 51 includes a first lateral signal sub-line 51a, a second lateral signal sub-line 51b, and a third lateral signal sub-line 51c that are configured to transmit a same signal.

The first lateral signal sub-line 51a is located in the region of the display region AA located at the side of the first through-hole K1 away from the second through-hole K2 and is disconnected at the first through-hole K1, the second lateral signal sub-line 51b is located in the region of the display region AA that is located between the second through-hole K2 and the third through-hole K3, and the third lateral signal sub-line 51c is located in the region of the display region AA that is located at the side of the third through-hole K3 away from the second through-hole K2.

The display panel includes a fourth wound line 44 located in the second non-display region NA2, and the second lateral signal sub-line 51b and the third lateral signal sub-line 51c are connected to each other through the fourth wound line 44.

In certain embodiments, the second lateral signal sub-line 51b is connected to the third lateral signal sub-line 51c through the fourth wound line 44, to ensure that the signal is provided to the lateral signal line located in the region of the display region that is located between the second through-hole K2 and the third through-hole K3. The first lateral signal sub-line 51a is disconnected at the first through-hole K1, and no wound line configured to connect the first lateral signal sub-line 51a and the second lateral signal sub-line 51b is provided in the first non-display region NA1, which can save the space of the first non-display region NA1.

Figure 25:
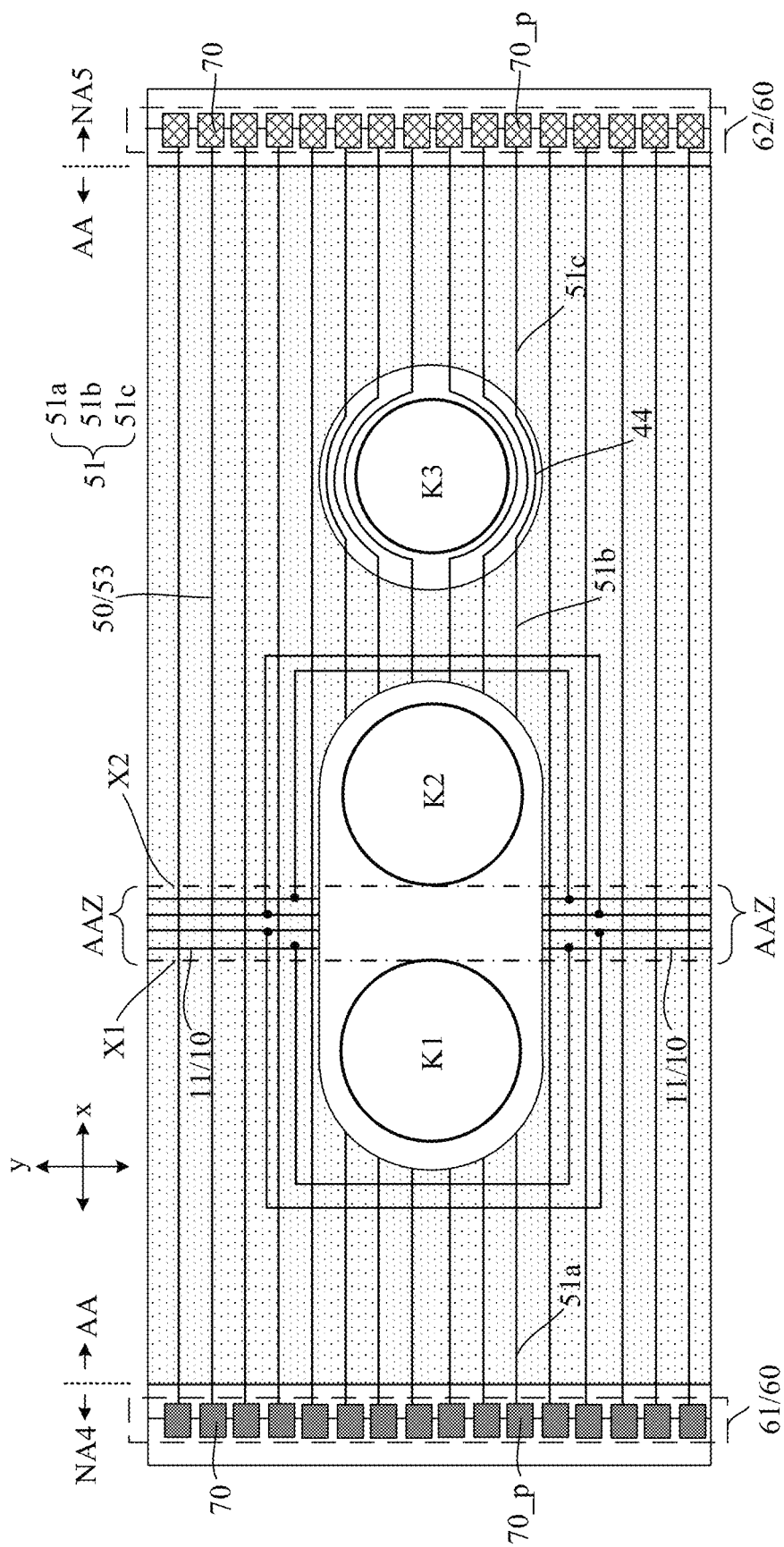
FIG. 25 is another partial schematic diagram of a display panel according to some embodiments of the present disclosure.

FIG. 25 is another partial schematic diagram of a display panel provided by some embodiments of the present disclosure. In some embodiments, as shown in FIG. 25, the non-display region includes a fourth non-display region NA4 and a fifth non-display region NA5. In the first direction x, the fourth non-display region NA4 and the fifth non-display region NA5 are respectively located at two sides of the display region AA. The display panel includes driving circuits 60 located in the non-display region, and the driving circuit 60 includes shift registers 70 that are cascaded. The driving circuits 60 include a first driving circuit 61 and a second driving circuit 62, the first driving circuit 61 is located in the fourth non-display region NA4, and the second driving circuit 62 is located in the fifth non-display region NA5. A p-th shift register 70_p of the first driving circuit 61 is electrically connected to one first lateral signal sub-line 51a, and a p-th shift register 70_p of the second driving circuit 62 is electrically connected to one third lateral signal sub-line 51c, where p is a positive integer. The p-th shift register 70_p of the first driving circuit 61 and the p-th shift register 70_p of the second driving circuit 62 are configured to transmit a same signal. The lateral signal line 50 includes a third lateral signal line 53, and the third lateral signal line 53 and the first lateral signal line 51 are configured to transmit a same type of signal. The third lateral signal line 53 passes through the display region AA in the first direction x, and is not disconnected by the through-hole. The third lateral signal line 53 has an end connected to one shift register 70 of the first driving circuit 61, and another end connected to one shift register 70 of the second driving circuit 62. In certain embodiments, the first lateral signal line 51 and the third lateral signal line 53 are driven in a bilateral-driving manner. A signal is provided to the first lateral signal sub-line 51a through the first driving circuit 61, and a signal is provided to the second lateral signal sub-line 51b and the third lateral signal sub-line 51c through the second driving circuit 62, to ensure that the pixels driven by the first lateral signal line 51 can all emit light normally, and no wound line configured to connect the lateral signal sub-lines of the first lateral signal line 51 is provided in the first non-display region NA1, thereby saving the space of the first non-display region NA1.

Figure 26:
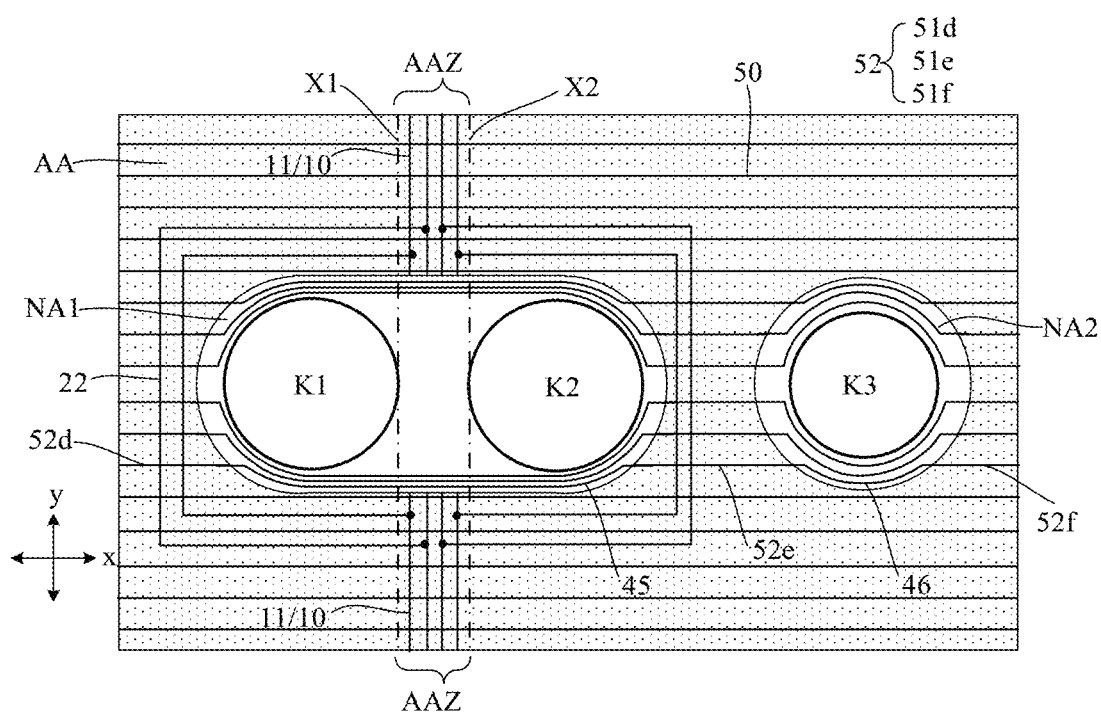
FIG. 26 is another partial schematic diagram of a display panel according to some embodiments of the present disclosure.

FIG. 26 is another partial schematic diagram of a display panel provided by some embodiments of the present disclosure. In some embodiments, as shown in FIG. 26, the display panel includes a lateral signal line 50 extending along the first direction x, and the lateral signal line 50 includes a second lateral signal lines 52. The second lateral signal line 52 includes a fourth lateral signal sub-line 52d, a fifth lateral signal sub-line 52e, and a sixth lateral signal sub-line 52f that are configured to transmit a same signal. The fourth lateral signal sub-line 52d is located in the region of the display region AA that is located at the side of the first through-hole K1 away from the second through-hole K2, the fifth lateral signal sub-line 52e is located in the region of the display region AA that is located between the second through-hole K2 and the third through-hole K3, and the sixth lateral signal sub-line 52f is located in the region of the display region AA located at the side of the third through-hole K3 away from the second through-hole K2. The display panel includes a fifth wound line 45 and a sixth wound line 46. The fifth wound line 45 has an end connected to the fourth lateral signal sub-line 52d, and another end connected to the fifth lateral signal sub-line 52e. The sixth wound line 46 has an end connected to the fifth lateral signal sub-line 52e, and another end connected to the sixth lateral signal sub-line 52f. The fifth wound line 45 is located in the first non-display region NA1, and the sixth wound line 46 is located in the second non-display region NA2.

In certain embodiments, the fourth lateral signal sub-line 52d and the fifth lateral signal sub-line 52e are connected to each other through the fifth wound line 45, and the fifth lateral signal sub-line 52e and the sixth lateral signal sub-line 52f are connected to each other through the sixth wound line 46. The lateral signal sub-lines disconnected by the through-holes are electrically connected to each other, thereby ensuring that the pixels driven by the second lateral signal line 52 can emit light normally.

Figure 27:
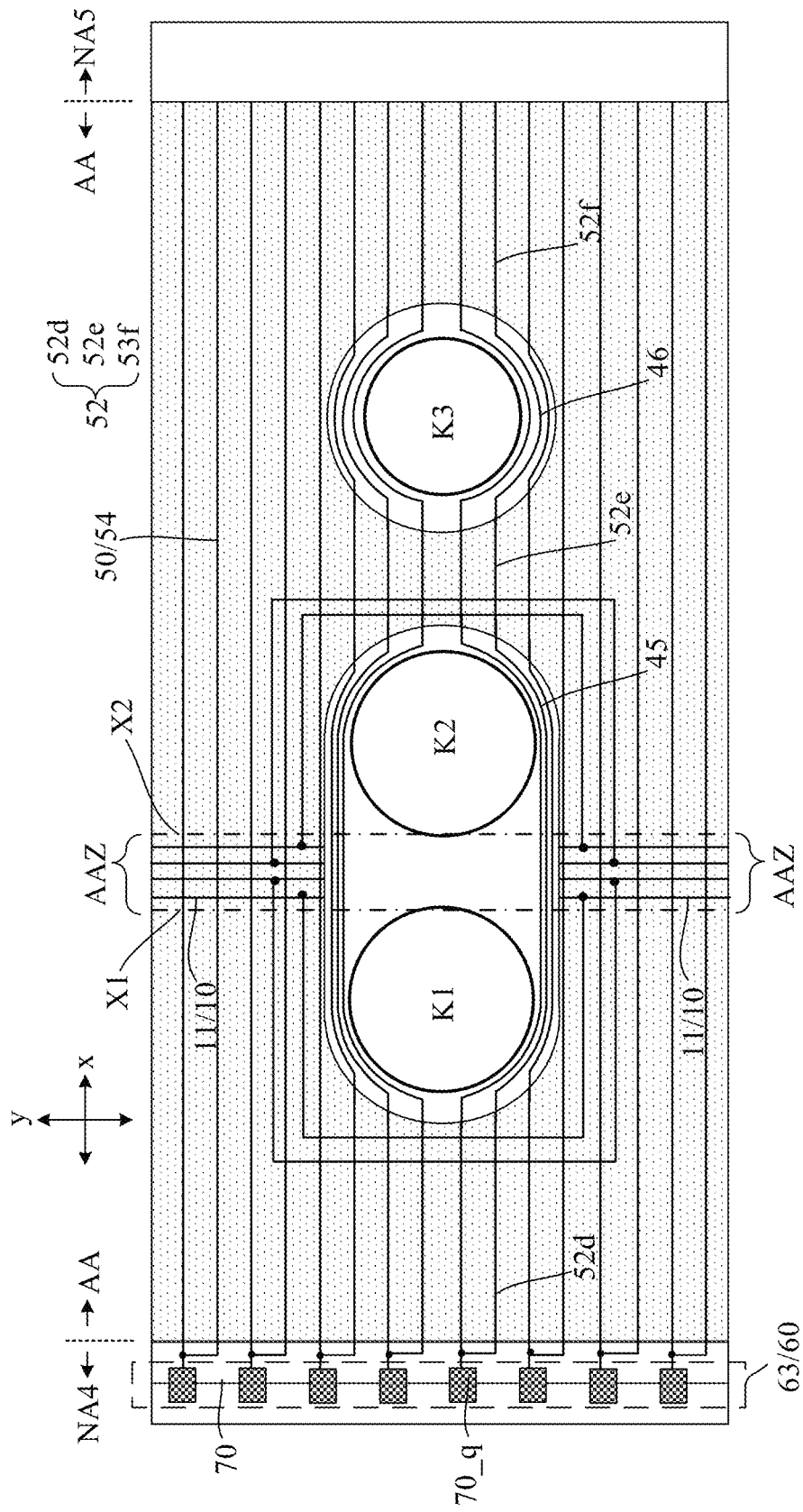
FIG. 27 is another partial schematic diagram of a display panel according to some embodiments of the present disclosure.

FIG. 27 is another partial schematic diagram of a display panel provided by some embodiments of the present disclosure. In some embodiments, as shown in FIG. 27, the non-display region includes a fourth non-display region NA4 and a fifth non-display region NA5. In the first direction x, the fourth non-display region NA4 and the fifth non-display region NA5 are respectively located at two sides of the display region AA. The display panel includes a driving circuit 60 located in the non-display region, and the driving circuit 60 includes shift registers 70 that are cascaded. The driving circuit 60 includes a third driving circuit 63 located in the fourth non-display region NA4, and a q-th shift register 70_q of the third driving circuit 63 is electrically connected to two fourth lateral signal sub-lines 52d. The lateral signal line 50 includes a fourth lateral signal line 54, and the fourth lateral signal line 54 and the second lateral signal line 52 are configured to transmit a same type of signal. The fourth lateral signal line 54 passes through the display region AA in the first direction x, and is not disconnected by the through-hole. One of two fourth lateral signal lines 54. Each of two fourth lateral signal lines 54 has an end connected to a same shift register 70 of the third driving circuit 63. In certain embodiments, the second lateral signal line 52 and the fourth lateral signal line 54 are driven in a unilateral-driving manner, and two lateral signal lines are connected to a same shift register 70, which can not only reduce the space occupied by the third driving circuit 63 in the non-display region, but also can reduce the number of the fifth wound lines 45 arranged in the first non-display region NA1 and the number of the sixth wound lines 46 arranged in the second non-display region NA2, thereby reducing a width of the frame of the non-display region.

FIG. 27 illustrates that the third driving circuit 63 is located in the fourth non-display region NA4. In other embodiments, the third driving circuit 63 is located in the fifth non-display region NA5, and the q-th shift register 70_$q$ of the third driving circuit 63 is electrically connected to two sixth lateral signal sub-lines 52$f$, where q is a positive integer.

Figure 28:
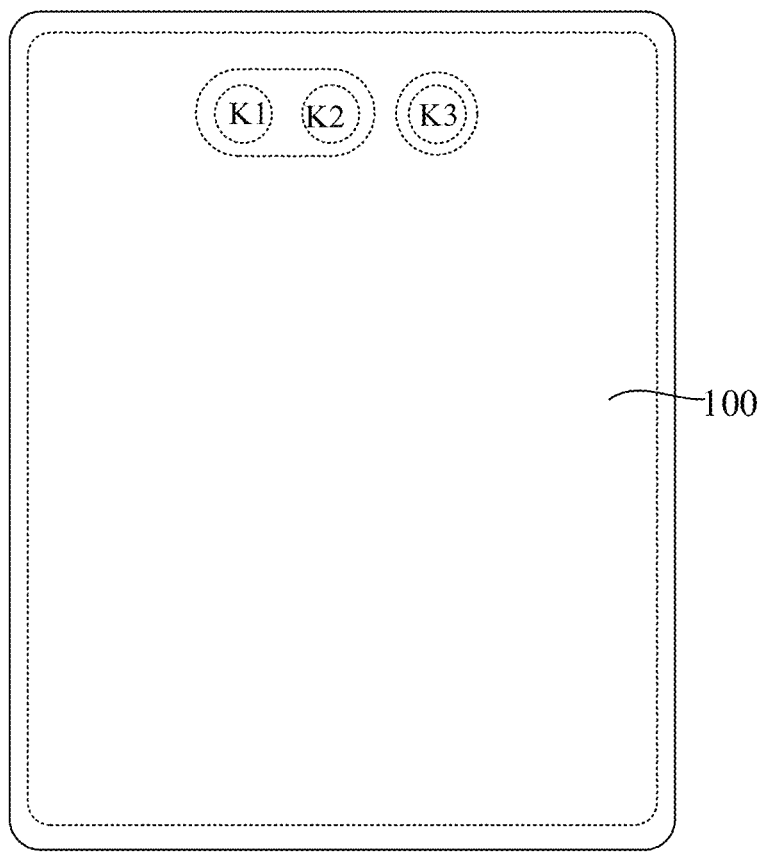
FIG. 28 is a schematic diagram of a display device according to some embodiments of the present disclosure.

Based on the same concept, some embodiments of the present disclosure further provide a display device. FIG. 28 is a schematic diagram of the display device provided by some embodiments of the present disclosure. As shown in FIG. 28, the display device includes the display panel 100 provided by any embodiment of the present disclosure. The structure of the display panel has been described in the above embodiments, and will not be repeated herein. The display device provided by the embodiments of the present disclosure can be, for example, an electronic device such as a mobile phone, a computer, a TV, a tablet, or a smart wearable device.

The above description illustrates only some embodiments of the present disclosure, and is not intended to limit the present disclosure. Any modifications, equivalent replacements, improvements, and the like made within the principle of the present disclosure shall fall within the protection scope of the present disclosure.

Finally, it should be noted that the foregoing embodiments are merely intended to describe and not to limit the technical solutions of the present disclosure. Although the present disclosure has been described in detail with reference to the foregoing embodiments, persons skilled in the art should understand that they can still make modifications to the technical solutions described in the foregoing embodiments or make equivalent replacements to some or all of the technical features thereof. These modifications or replacements fall within the scope of the technical solutions of the embodiments of the present disclosure.

What is claimed is:
1. A display panel, comprising:
a display region;
a non-display region;
a first functional device area;
a second functional device area; and
a third functional device area,
wherein the first functional device area, the second functional device area, and the third functional device area are arranged along a first direction in the display region,
wherein the non-display region comprises a first non-display region and a second non-display region;
wherein the first non-display region surrounds the first functional device area and the second functional device area, and the second non-display region surrounds the third functional device area;
wherein the display region has a symmetry axis extending along a second direction, the second direction intersecting the first direction; and
wherein the symmetry axis overlaps with the second functional device area or is located between the second functional device area and the third functional device area,
wherein the display region defines a first virtual straight line and a second virtual straight line that each extend along the second direction, wherein an edge of the first functional device area that is closest to the second functional device area in the first direction intersects the first virtual straight line, and an edge of the second functional device area that is closest to the first functional device area in the first direction intersects the second virtual straight line; and the display region comprises middle regions located between the first virtual straight line and the second virtual straight line;
wherein the display region further comprises first display regions, second display regions, and third display regions, wherein, in the second direction, two of the first display regions are respectively located at two sides of the first functional device area, two of the second display regions are respectively located at two sides of the second functional device area, and two of the third display regions are respectively located at two sides of the third functional device area; and wherein the first virtual straight line defines boundary between the first display regions and the middle regions, and the second virtual straight line defines boundary between the second display regions and the middle regions;
wherein the display panel comprises first signal lines, second signal lines, and third signal lines that each extend along the second direction, wherein each of the first signal lines is located in one of the first display regions, each of the second signal lines is located in one of the second display regions, and each of the third signal lines is located in one of the third display regions;
wherein the display panel comprises first wound lines, second wound lines, and third wound lines, wherein two of the first signal lines respectively located at two sides of the first functional device area are connected to each other through one of the first wound lines, two of the second signal lines respectively located at two sides of the second functional device area are connected to each other through one of the second wound lines, and two of the third signal lines respectively located at two sides of the third functional device area are connected to each other through one of the third wound lines; and
wherein the first wound lines and the second wound lines are located in the first non-display region, and the third wound lines are located in the second non-display region; or, the first wound lines, the second wound lines, and the third wound lines are all located in the display region,
wherein the display panel further comprises:
fourth signal lines each extending along the second direction and located in the middle regions; and
a connection line,
wherein the connection line has two ends respectively connecting the fourth signal lines located in the middle regions that are located at two sides of the first non-display region; and
wherein the connection line comprises at least one of a first connection line located between the first functional device area and the second functional device area or a second connection line at least partially located in the display region.

2. The display panel according to claim 1, wherein the first connection line comprises a first connection sub-line and a second connection sub-line that are adjacent to each other;
   wherein the fourth signal line comprises a first signal sub-line and a second signal sub-line that are adjacent to each other, wherein the first signal sub-line is electrically connected to the first connection sub-line, and the second signal sub-line is electrically connected to the second connection sub-line; and the first connection sub-line comprises a first line sub-segment, and the second connection sub-line comprises a second line sub-segment; and
   wherein a distance between the first signal sub-line and the second signal sub-line in the first direction is greater than a distance between the first line sub-segment and the second line sub-segment in the first direction.

3. The display panel according to claim 1, wherein the first connection line comprises a third connection sub-line and a fourth connection sub-line;
   wherein the fourth signal line comprises a third signal sub-line and a fourth signal sub-line, wherein the third signal sub-line is electrically connected to the third connection sub-line, and the fourth signal sub-line is electrically connected to the fourth connection sub-line; and
   wherein the third connection sub-line and the fourth connection sub-line are located in different layers.

4. The display panel according to claim 1, wherein the non-display region comprises a third non-display region located at a side of the middle region away from the first non-display region;
   wherein the second connection line comprises at least one fifth connection sub-line, wherein one of the at least one fifth connection sub-line comprises a first line segment and a second line segment are connected, wherein the first line segment is located in the display region, and the second line segment is located in the third non-display region; and
   wherein the first line segment has an end connected to the fourth signal line in one of the middle regions, and the second line segment has an end connected to the fourth signal line in another one of the middle regions.

5. The display panel according to claim 4, wherein the first line segment comprises a third line sub-segment extending along the second direction, wherein at least a part of the third line sub-segment is located in a region of the display region that is located at a side of the first functional device area away from the second functional device area.

6. The display panel according to claim 4, wherein the first line segment comprises a third line sub-segment extending along the second direction, wherein at least a part of the third line sub-segment is located in a region of the display region that is located between the second functional device area and the third functional device area.

7. The display panel according to claim 4, wherein the first line segment comprises a third line sub-segment extending along the second direction, wherein at least a part of the third line sub-segment is located in a region of the display region that is located at a side of the third functional device area away from the second functional device area.

8. The display panel according to claim 4, wherein the first line segment comprises third line sub-segments each extending along the second direction, wherein a number mi of at least one third line sub-segment of the third line sub-segments that is located in a region of the display region located at a side of the first functional device area away from the second functional device area, and a number $m_2$ of another at least one third line sub-segment of the third line sub-segments that is located in a region of the display panel located at a side of the second functional device area away from the first functional device area, satisfy $|m_1-m_2|\leq 1$.

9. The display panel according to claim 4, wherein the second connection line comprises at least one sixth connection sub-line, wherein one of the at least one sixth connection sub-line comprises two third line segments each extending along the first direction and a fourth line segment extending along the second direction, wherein the fourth line segment has two ends that are respectively connected to the two third line segments, the two third line segments and the fourth line segment are located in the display region, and each of the two third line segments is connected to one of the fourth signal lines that is located in a respective one of the middle regions; and
   wherein a number of the at least one fifth connection sub-line is smaller than a number of the at least one sixth connection sub-line.

10. The display panel according to claim 1, wherein the second connection line comprises at least one sixth connection sub-line, wherein one of the at least one sixth connection sub-line comprises two third line segments each extending in the first direction and a fourth line segment each extending in the second direction, wherein the fourth line segments has two ends respectively connected to the two third line segments; and
    wherein the two third line segments and the fourth line segment are located in the display region, and each of the two third line segments is connected to one of the fourth signal lines that is located in a respective one of the middle regions.

11. The display panel according to claim 10, wherein at least one of the fourth line segments is located in a region of the display region that is located at a side of the first functional device area away from the second functional device area.

12. The display panel according to claim 10, wherein at least one of the fourth line segments is located in a region of the display region that is located between the second functional device area and the third functional device area.

13. The display panel according to claim 10, wherein at least one of the fourth line segments is located in a region of the display region that is located at a side of the third functional device area away from the second functional device area.

14. The display panel according to claim 10, wherein a number $m_3$ of at least one fourth line segment of the fourth line segments that is located in a region of the display region located at a side of the first functional device area away from the second functional device area, and a number $m_4$ of another at least one fourth line segment of the fourth line segments that is located in a region of the display panel located at a side of the second functional device area away from the first functional device area, satisfy $|m_3-m_4|\leq 1$.

15. The display panel according to claim 1, wherein in the first direction, a width $d_3$ of the second non-display region located at a side of the third functional device area, a width $d_4$ of the first non-display region located at a side of the first functional device area away from the second functional device area and a width $d_5$ of the first non-display region located at a side of the second functional device area close to the third functional device area satisfy: $d_3>d_4$, and $d_3>d_5$.

16. The display panel according to claim 1, wherein a diameter of the third functional device area is smaller than a diameter of the first functional device area, and is also smaller than a diameter of the second functional device area.

17. The display panel according to claim 1, wherein a number of at least one first wound line of the first wound lines located at a side of the first functional device area is equal to a number of another at least one first wound line of the first wound lines located at another side of the first functional device area, and/or a number of at least one second wound line of the second wound lines located at a side of the second functional device area is equal to a number of another at least one second wound line of the second wound lines located at another side of the second functional device area.

18. The display panel according to claim 1, wherein a number $n_1$ of at least one first wound line of the first wound lines located at a side of the first functional device area away from the second functional device area and a number $n_2$ of another at least one first wound line of the first wound lines located at a side of the first functional device area close to the second functional device area satisfy: $n_1<n_2$; and/or,
wherein a number $n_3$ of at least one second wound line of the second wound lines located at a side of the second functional device area away from the first functional device area and a number $n_4$ of another at least one second wound line of the second wound lines located at a side of the second functional device area close to the first functional device area satisfy: $n_3<n_4$.

19. A display panel, comprising:
a display region;
a non-display region;
a first functional device area;
a second functional device area; and
a third functional device area,
wherein the first functional device area, the second functional device area, and the third functional device area are arranged along a first direction in the display region,
wherein the non-display region comprises a first non-display region and a second non-display region; wherein the first non-display region surrounds the first functional device area and the second functional device area, and the second non-display region surrounds the third functional device area;
wherein the display region has a symmetry axis extending along a second direction, the second direction intersecting the first direction; and
wherein the symmetry axis overlaps with the second functional device area or is located between the second functional device area and the third functional device area,
wherein the display region defines a first virtual straight line and a second virtual straight line that each extend along the second direction, wherein an edge of the first functional device area that is closest to the second functional device area in the first direction intersects the first virtual straight line, and an edge of the second functional device area that is closest to the first functional device area in the first direction intersects the second virtual straight line; and the display region comprises middle regions located between the first virtual straight line and the second virtual straight line;
wherein the display region further comprises first display regions, second display regions, and third display regions, wherein, in the second direction, two of the first display regions are respectively located at two sides of the first functional device area, two of the second display regions are respectively located at two sides of the second functional device area, and two of the third display regions are respectively located at two sides of the third functional device area; and wherein the first virtual straight line defines boundary between the first display regions and the middle regions, and the second virtual straight line defines boundary between the second display regions and the middle regions;
wherein the display panel comprises first signal lines, second signal lines, and third signal lines that each extend along the second direction, wherein each of the first signal lines is located in one of the first display regions, each of the second signal lines is located in one of the second display regions, and each of the third signal lines is located in one of the third display regions;
wherein the display panel comprises first wound lines, second wound lines, and third wound lines, wherein two of the first signal lines respectively located at two sides of the first functional device area are connected to each other through one of the first wound lines, two of the second signal lines respectively located at two sides of the second functional device area are connected to each other through one of the second wound lines, and two of the third signal lines respectively located at two sides of the third functional device area are connected to each other through one of the third wound lines; and
wherein the first wound lines and the second wound lines are located in the first non-display region, and the third wound lines are located in the second non-display region; or, the first wound lines, the second wound lines, and the third wound lines are all located in the display region,
wherein the first wound lines and the second wound lines are located between the first functional device area and the second functional device area.

20. The display panel according to claim 1, wherein one of the first wound lines comprises a first wound sub-line and a second wound sub-line that are located in different layers; and/or,
wherein one of the second wound lines comprises a third wound sub-line and a fourth wound sub-line that are located in different layers.

21. The display panel according to claim 1, wherein, at a same side of each of the three though-holes in the first direction, at least two of a number of at least one first wound line of the first wound lines at the side of the first functional device area, a number of at least one second wound line of the second wound lines at the side of the second functional device area, or a number of at least one third wound line of the third wound lines at the side of the third functional device area are different from one another.

22. The display panel according to claim 1, wherein a number of at least one third wound line of the third wound lines located at a side of the third functional device area is equal to a number of another at least one third wound line of the third wound lines located at another side of the third functional device area.

23. A display panel, comprising:
a display region;
a non-display region;
a first functional device area;
a second functional device area; and
a third functional device area,
wherein the first functional device area, the second functional device area, and the third functional device area are arranged along a first direction in the display region, wherein the non-display region comprises a first non-display region and a second non-display region; wherein the first non-display region surrounds the first functional device area and the second functional device area, and the second non-display region surrounds the third functional device area;

wherein the display region has a symmetry axis extending along a second direction, the second direction intersecting the first direction; and wherein the symmetry axis overlaps with the second functional device area or is located between the second functional device area and the third functional device area, wherein the display panel further comprises:

at least one lateral signal line extending along the first direction; and a fourth wound line located in the second non-display region, wherein the at least one lateral signal line comprises at least one first lateral signal line, wherein the at least one first lateral signal line comprises a first lateral signal sub-line, a second lateral signal sub-line, and a third lateral signal sub-line that are configured to transmit a same signal;

wherein the first lateral signal sub-line is located in a region of the display region that is located at a side of the first functional device area away from the second functional device area, and the first lateral signal line is disconnected at the first functional device area;

wherein the second lateral signal sub-line is located in a region of the display region that is located between the second functional device area and the third functional device area, and the third lateral signal sub-line is located in a region of the display region that is located at a side of the third functional device area away from the second functional device area; and wherein the second lateral signal sub-line and the third lateral signal sub-line are connected to each other through the fourth wound line.

24. The display panel according to claim 23, wherein the non-display region comprises a fourth non-display region and a fifth non-display region that are respectively located at two sides of the display region in the first direction;

wherein the display panel comprises driving circuits located in the non-display region, wherein the driving circuits each comprise shift registers that are cascaded;

wherein the driving circuits comprise a first driving circuit located in the fourth non-display region and a second driving circuit located in the fifth non-display region; and wherein a p-th shift register of the shift registers of the first driving circuit is electrically connected to one of the at least one first lateral signal sub-line of the at least one first lateral signal line, and a p-th shift register of the shift registers of the second driving circuit is electrically connected to one of the at least one third lateral signal sub-line of the at least one first lateral signal line, where p is a positive integer.

25. The display panel according to claim 1, further comprising:

at least one lateral signal line extending along the first direction, wherein the at least one lateral signal line comprises at least one second lateral signal line, wherein the at least one second lateral signal line comprises a fourth lateral signal sub-line, a fifth lateral signal sub-line, and a sixth lateral signal sub-line that are configured to transmit a same signal;

wherein the fourth lateral signal sub-line is located in a region of the display region that is located at a side of the first functional device area away from the second functional device area, and the fifth lateral signal sub-line is located in a region of the display region that is located between the second functional device area and the third functional device area, the sixth lateral signal sub-line is located in a region of the display region that is located at a side of the third functional device area away from the second functional device area; and wherein the display panel comprises a fifth wound line and a sixth wound line, wherein the fifth wound line has an end connected to the fourth lateral signal sub-line, and another end connected to the fifth lateral signal sub-line; and the sixth lateral signal sub-line has an end connected to the fifth lateral signal sub-line, and another end connected to the sixth lateral signal sub-line; and wherein the fifth wound line is located in the first non-display region, and the sixth wound line is located in the second non-display region.

26. The display panel according to claim 25, wherein the non-display region comprises a fourth non-display region and a fifth non-display region;

wherein, in the first direction, the fourth non-display region and the fifth non-display region are respectively located at two sides of the display region;

wherein the display panel comprises a driving circuit, wherein the driving circuit comprises shift registers that are cascaded;

wherein the at least one second lateral signal line comprises at least two second lateral signal lines; and wherein the driving circuit comprises a third driving circuit, wherein the third driving circuit is located in the fourth non-display region, and a q-th shift register of the shift registers of the third driving circuit is electrically connected to two fourth lateral signal sub-lines of the fourth lateral signal sub-lines of the at least two second lateral signal lines; or the third driving circuit is located in the fifth non-display region, and a q-th shift register of the shift registers of the third driving circuit is electrically connected to two sixth lateral signal sub-lines of the sixth lateral signal sub-lines of the at least two second lateral signal lines, where q is a positive integer.

27. The display panel according to claim 1, wherein the second functional device area has a first edge close to the third functional device area, and the third functional device area has a second edge close to the second functional device area, wherein a minimum distance from the first edge to the symmetry axis in the first direction is smaller than a minimum distance from the second edge to the symmetry axis in the first direction.

28. A display device, comprising:

a display panel comprising:

a display region;

a non-display region;

a first functional device area;

a second functional device area; and a third functional device area, wherein the first functional device area, the second functional device area, and the third functional device area are arranged along a first direction in the display region, wherein the non-display region comprises a first non-display region and a second non-display region;

wherein the first non-display region surrounds the first functional device area and the second functional device area, and the second non-display region surrounds the third functional device area;

wherein the display region defines a symmetry axis extending along a second direction, the second direction intersecting the first direction; and wherein the symmetry axis overlaps with the second functional device area or is located between the second functional device area and the third functional device area, wherein the display region defines a first virtual straight line and a second virtual straight line that each extend along the second direction, wherein an edge of the first functional device area that is closest to the second functional device area in the first direction intersects the first virtual straight line, and an edge of the second functional device area that is closest to the first functional device area in the first direction intersects the second virtual straight line; and the display region comprises middle regions located between the first virtual straight line and the second virtual straight line;

wherein the display region further comprises first display regions, second display regions, and third display regions, wherein, in the second direction, two of the first display regions are respectively located at two sides of the first functional device area, two of the second display regions are respectively located at two sides of the second functional device area, and two of the third display regions are respectively located at two sides of the third functional device area; and wherein the first virtual straight line defines boundary between the first display regions and the middle regions, and the second virtual straight line defines boundary between the second display regions and the middle regions;

wherein the display panel comprises first signal lines, second signal lines, and third signal lines that each extend along the second direction, wherein each of the first signal lines is located in one of the first display regions, each of the second signal lines is located in one of the second display regions, and each of the third signal lines is located in one of the third display regions;

wherein the display panel comprises first wound lines, second wound lines, and third wound lines, wherein two of the first signal lines respectively located at two sides of the first functional device area are connected to each other through one of the first wound lines, two of the second signal lines respectively located at two sides of the second functional device area are connected to each other through one of the second wound lines, and two of the third signal lines respectively located at two sides of the third functional device area are connected to each other through one of the third wound lines; and wherein the first wound lines and the second wound lines are located in the first non-display region, and the third wound lines are located in the second non-display region; or, the first wound lines, the second wound lines, and the third wound lines are all located in the display region, wherein the display panel further comprises:

fourth signal lines each extending along the second direction and located in the middle regions; and a connection line, wherein the connection line has two ends respectively connecting the fourth signal lines located in the middle regions that are located at two sides of the first non-display region; and wherein the connection line comprises at least one of a first connection line located between the first functional device area and the second functional device area or a second connection line at least partially located in the display region.

* * * * *